(12) United States Patent
Fujita

(10) Patent No.: US 7,724,672 B2
(45) Date of Patent: *May 25, 2010

(54) ATM CELL TRANSFER APPARATUS WITH HARDWARE STRUCTURE FOR OAM CELL GENERATION

(75) Inventor: Yoshitaka Fujita, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 1237 days.

This patent is subject to a terminal disclaimer.

(21) Appl. No.: 11/061,748

(22) Filed: Feb. 22, 2005

(65) Prior Publication Data

US 2005/0180331 A1    Aug. 18, 2005

Related U.S. Application Data

(63) Continuation of application No. 09/598,215, filed on Jun. 21, 2000, now Pat. No. 6,868,066.

(30) Foreign Application Priority Data

Jun. 24, 1999    (JP) ............................. 1999/178972

(51) Int. Cl.
H04L 12/26    (2006.01)
H04L 12/28    (2006.01)

(52) U.S. Cl. ................................. 370/236.2; 370/395.1
(58) Field of Classification Search ........................ None
See application file for complete search history.

(56) References Cited

U.S. PATENT DOCUMENTS 5,719,863 A    2/1998    Hummel ...................... 370/392
5,818,842 A    10/1998   Burwell et al. .............. 370/397

(Continued)

FOREIGN PATENT DOCUMENTS

JP    4-207243    7/1992

(Continued)

OTHER PUBLICATIONS

ITU-T Recommendation I.610, Feb. 1999, 88 pages.

Primary Examiner—Melanie Jagannathan
(74) Attorney, Agent, or Firm—Harrity & Harrity, LLP

(57) ABSTRACT

An ATM (asynchronous transfer mode) cell transfer apparatus includes an input interface, a switch block, and an OAM cell processing hardware block having a memory unit. The input interface receives an SDH/SONET signal on each of a plurality of first transfer paths to output an input OAM cell corresponding to the SDH/SONET signal to one of a plurality of input ports of the switch block corresponding to the first transfer path for the SDH/SONET signal to be transferred. The switch block receives the input OAM (operation and maintenance) cell from the corresponding input port as an OAM input port to output to the OAM cell processing hardware block together with a port number of the OAM input port, and receives at least one output OAM cell from the OAM cell processing hardware block to output to at least one of the plurality of output ports based on the received output OAM cell. The OAM cell processing hardware block reads out the at least one output OAM cell corresponding to the input OAM cell from the memory unit based on the input OAM cell and the port number supplied from the switch block, and outputs the at least one output OAM cell to the switch block.

18 Claims, 19 Drawing Sheets

U.S. PATENT DOCUMENTS

| | | | |
|---|---|---|---|
| 5,864,555 A | 1/1999 | Mathur et al. | 370/395 |
| 5,872,770 A | 2/1999 | Park et al. | 370/249 |
| 5,920,558 A | 7/1999 | Saito et al. | 370/359 |
| 6,023,467 A | 2/2000 | Abdelhamid et al. | 370/395 |
| 6,075,786 A * | 6/2000 | Kunito | 370/389 |
| 6,118,783 A * | 9/2000 | Kunito | 370/399 |
| 6,198,726 B1 * | 3/2001 | Hayami et al. | 370/236.2 |
| 6,198,742 B1 * | 3/2001 | Saito et al. | 370/236.1 |
| 6,212,186 B1 | 4/2001 | Tada et al. | 370/395 |
| 6,272,137 B1 | 8/2001 | Noiri | 370/395 |
| 6,636,484 B1 * | 10/2003 | Agrawal et al. | 370/248 |
| 6,801,504 B1 * | 10/2004 | Ito | 370/242 |

FOREIGN PATENT DOCUMENTS

| | | |
|---|---|---|
| JP | 4-363939 | 12/1992 |
| JP | 9-36869 | 2/1997 |
| JP | 2746284 | 2/1998 |
| JP | 10-65682 | 3/1998 |
| JP | 10-65696 | 3/1998 |
| JP | 10-262064 | 9/1998 |
| JP | 10-271111 | 10/1998 |
| JP | 2851941 | 11/1998 |
| JP | 11-8628 | 1/1999 |
| JP | 11-252098 | 9/1999 |

* cited by examiner

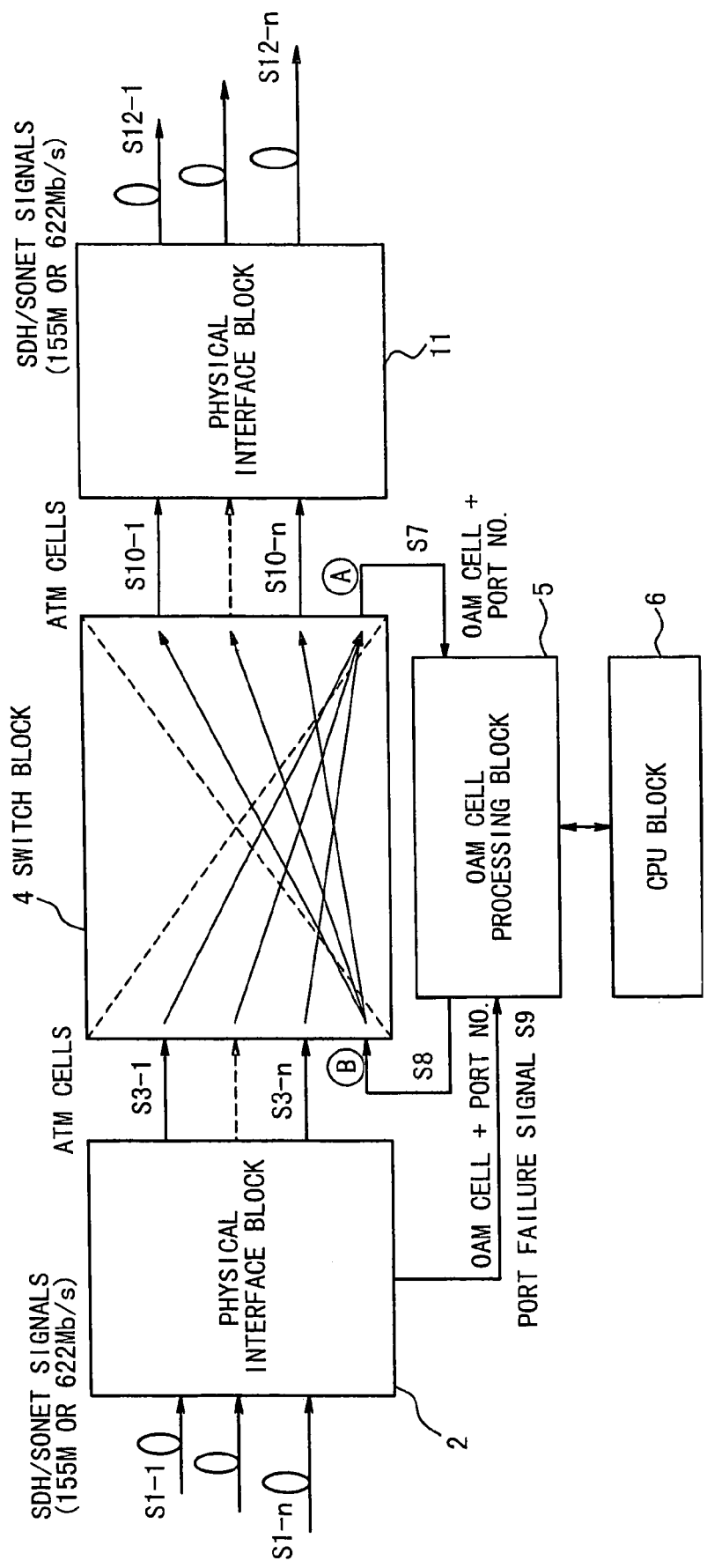

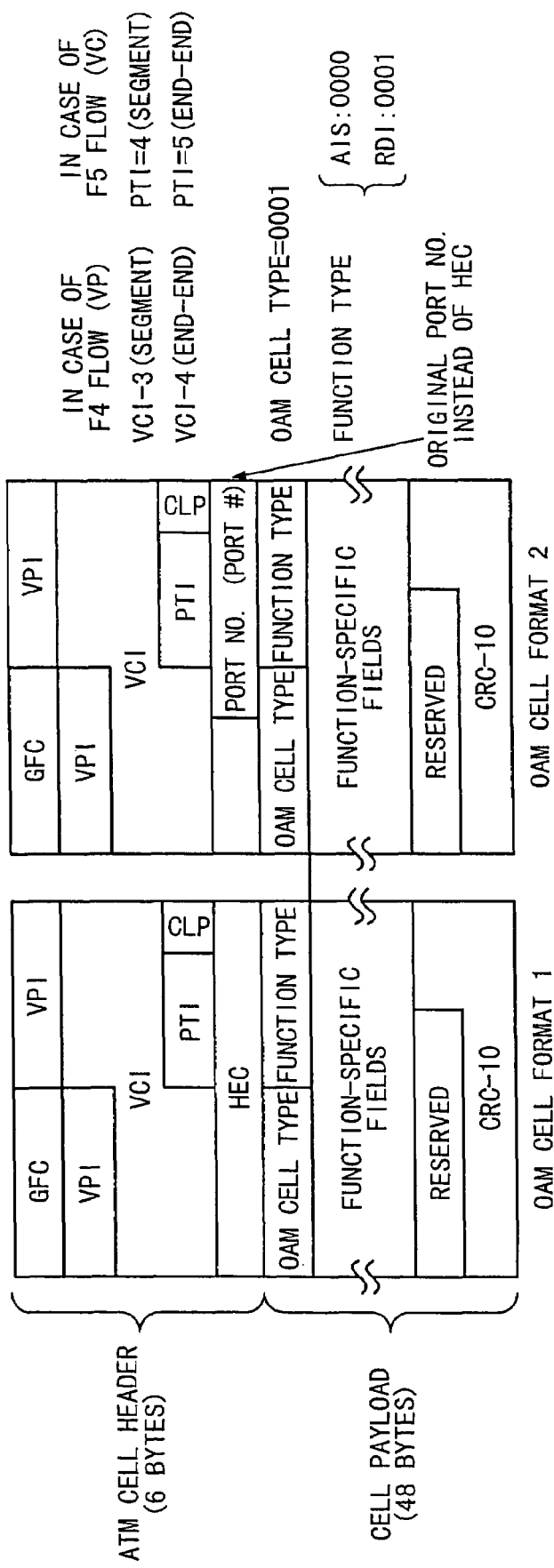

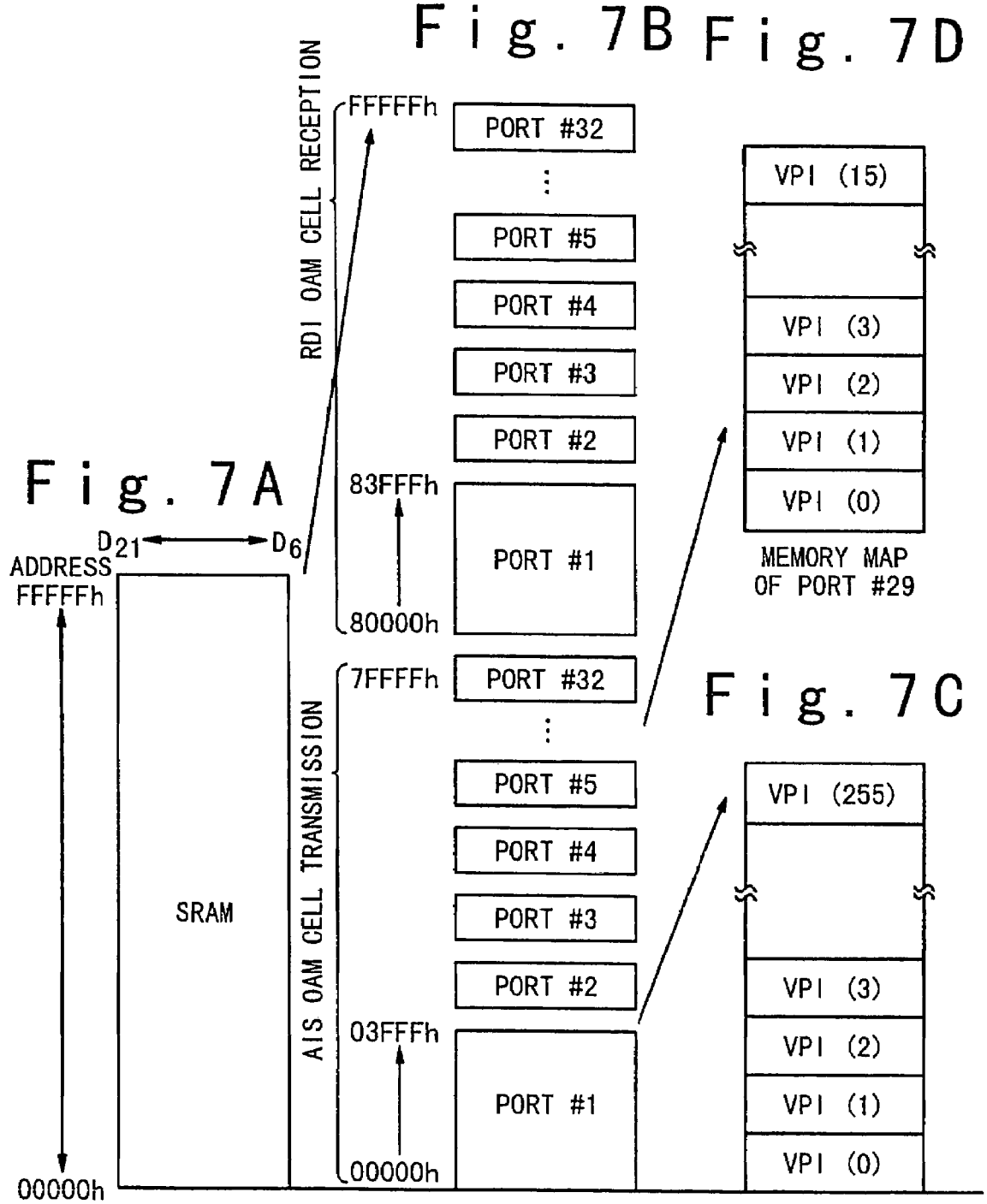

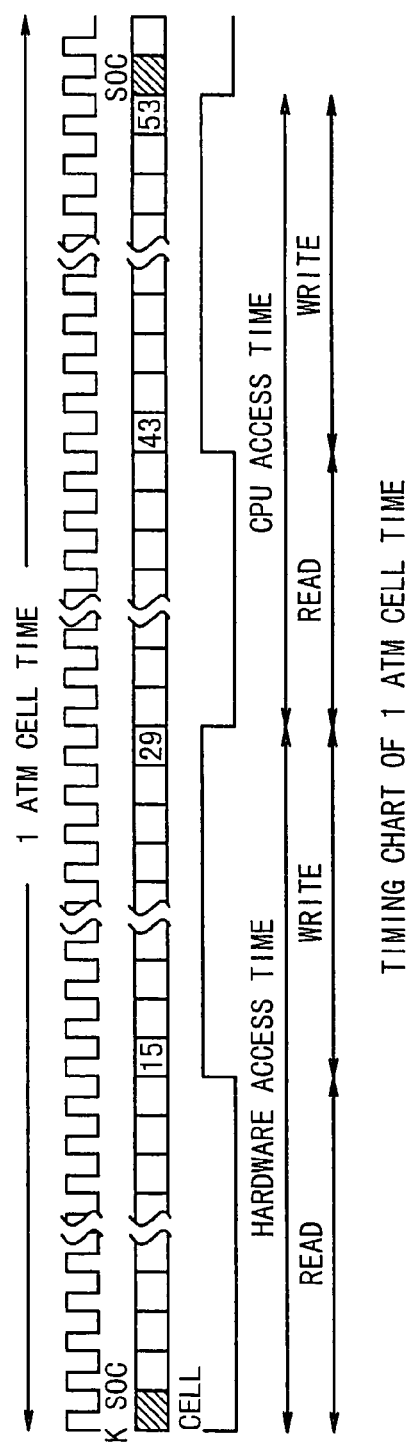

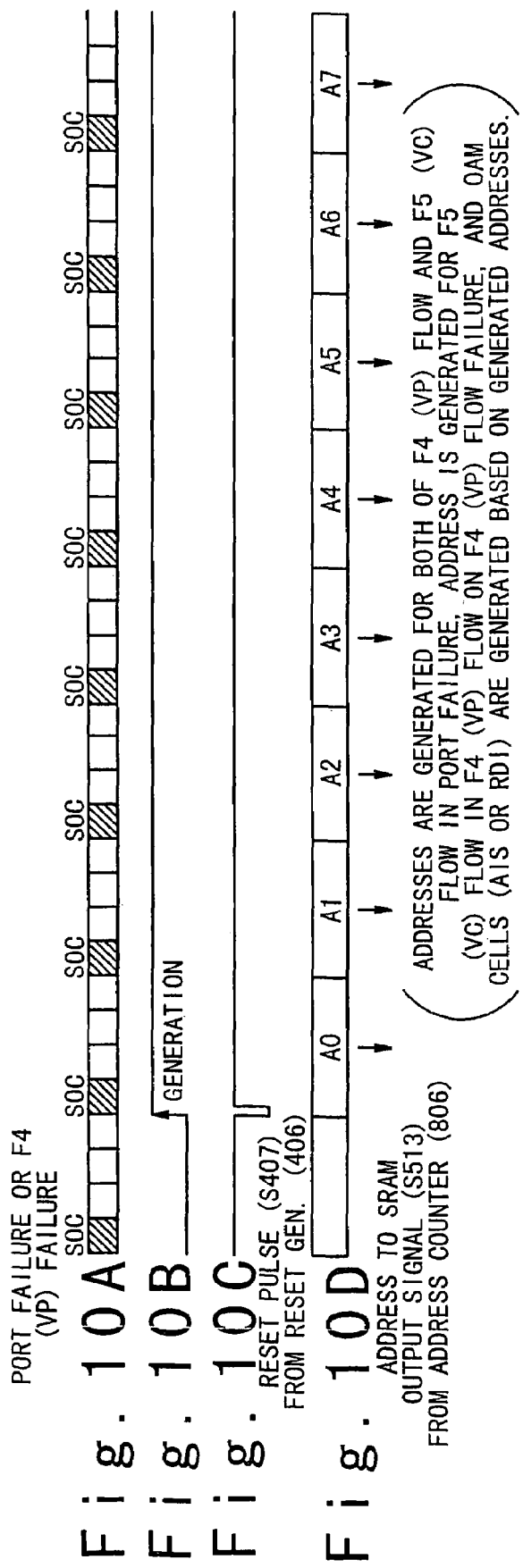

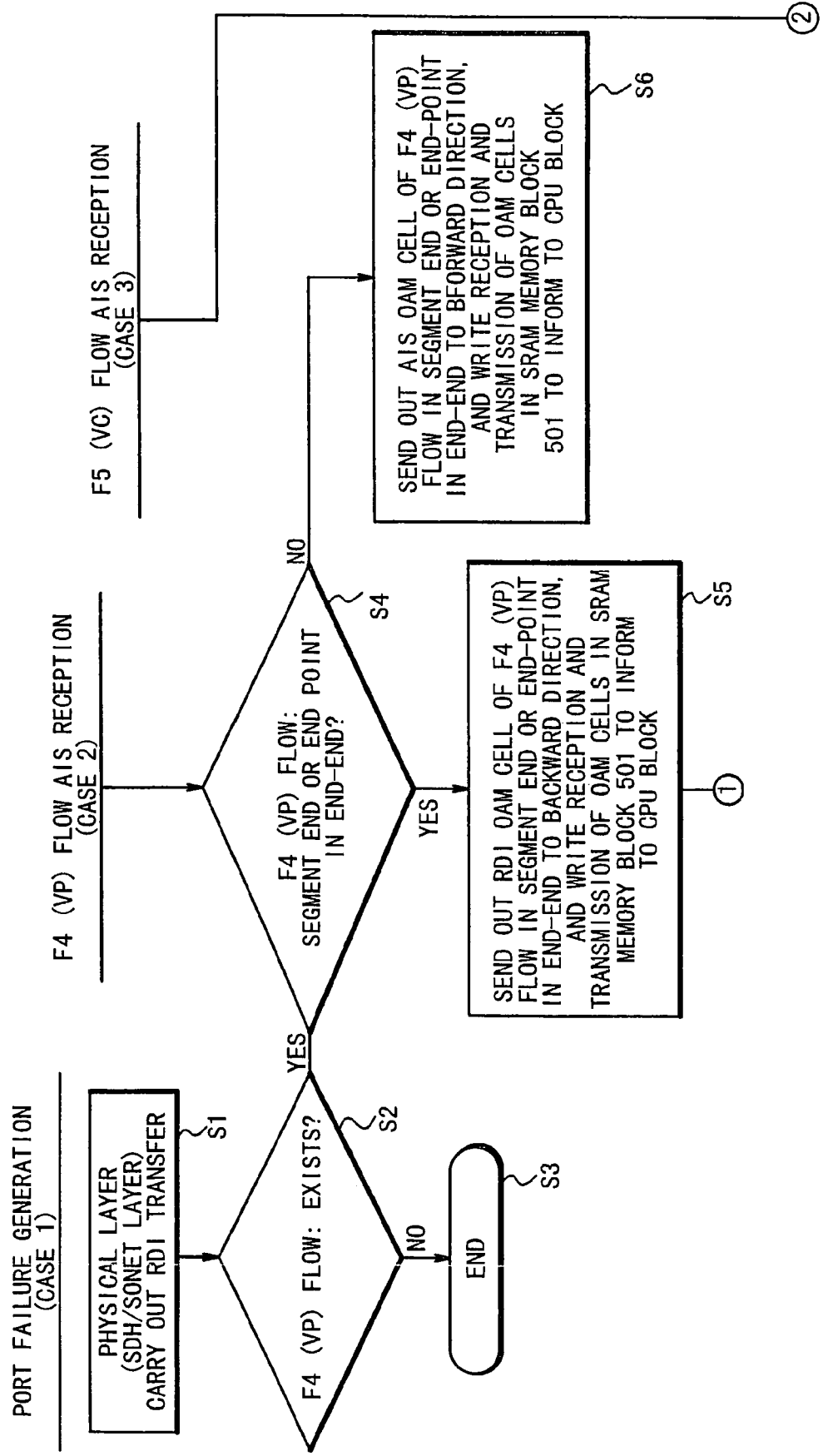

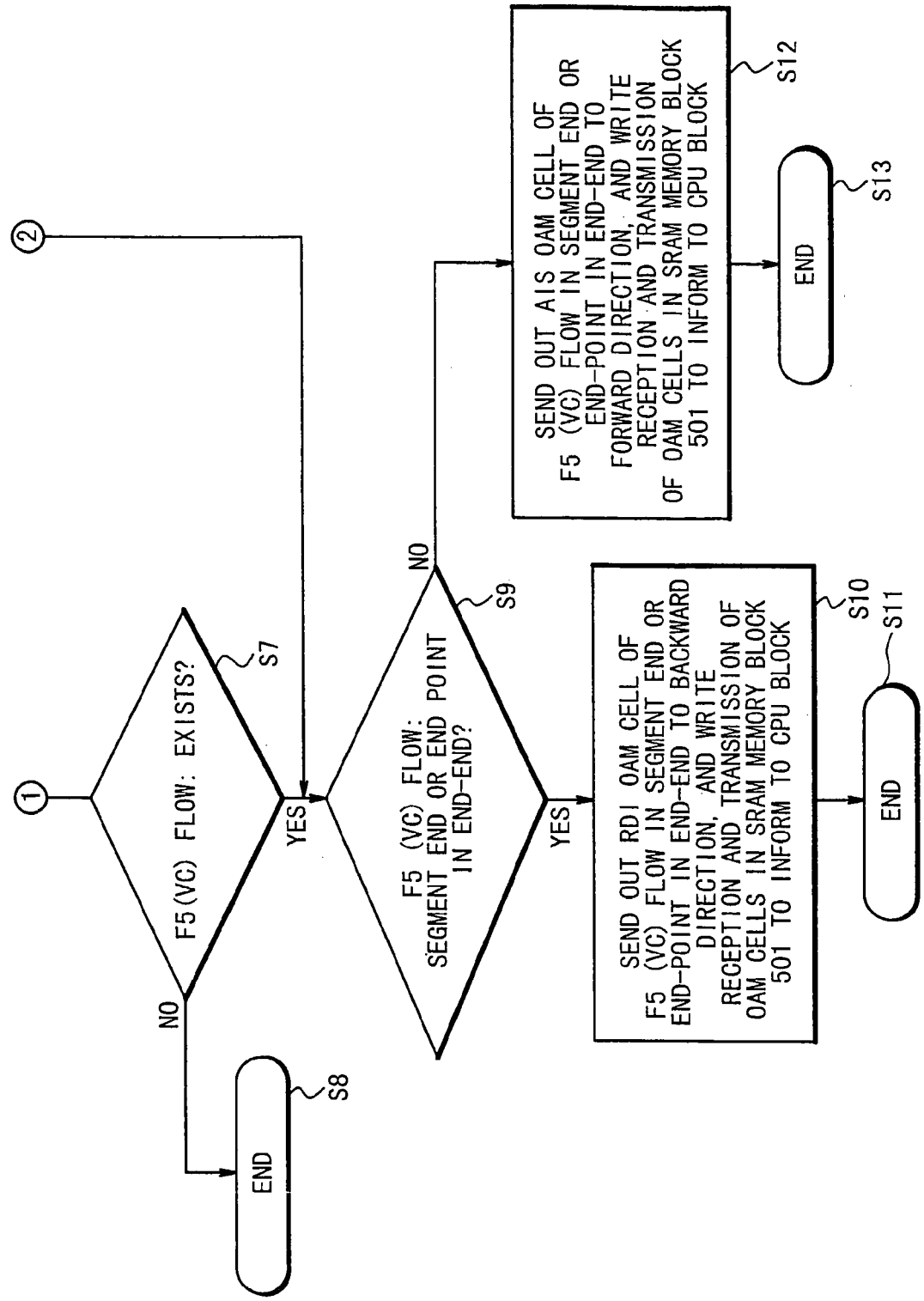

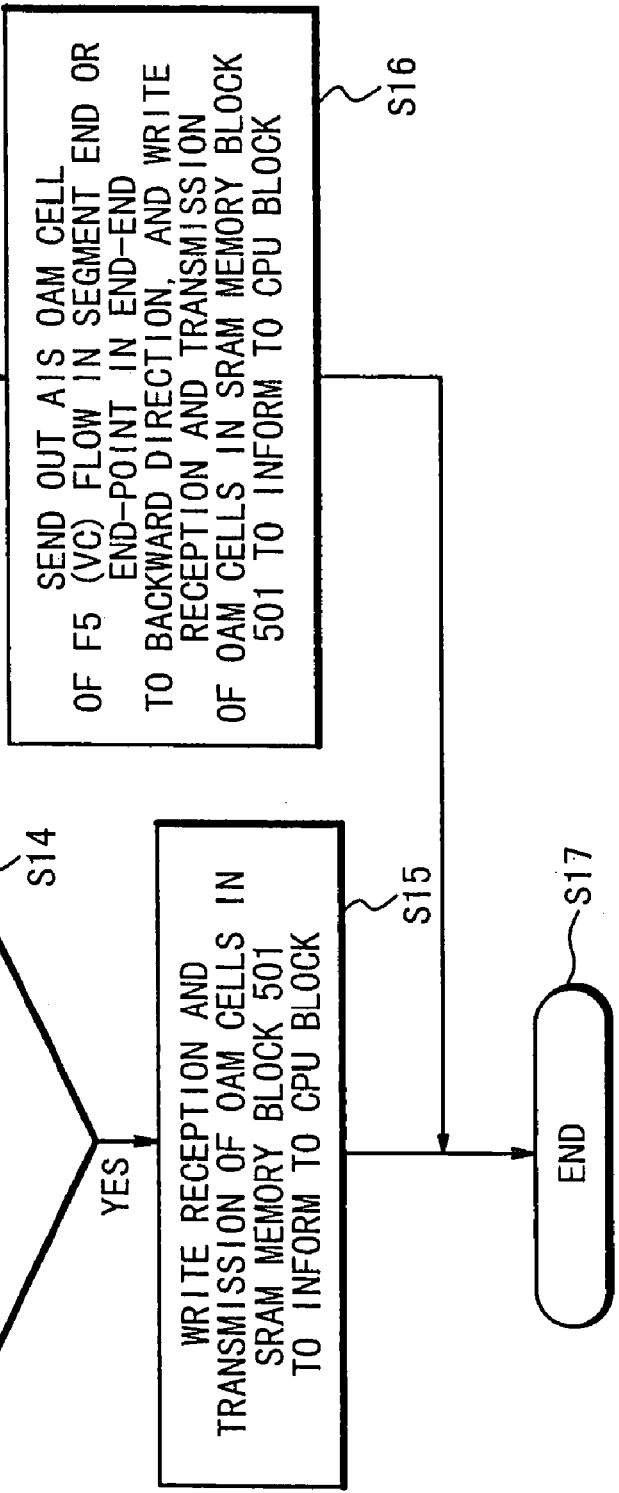

Fig. 14
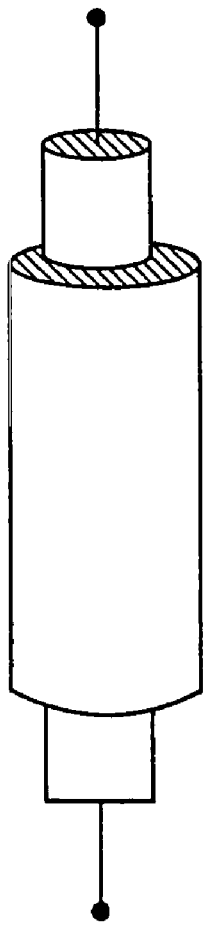
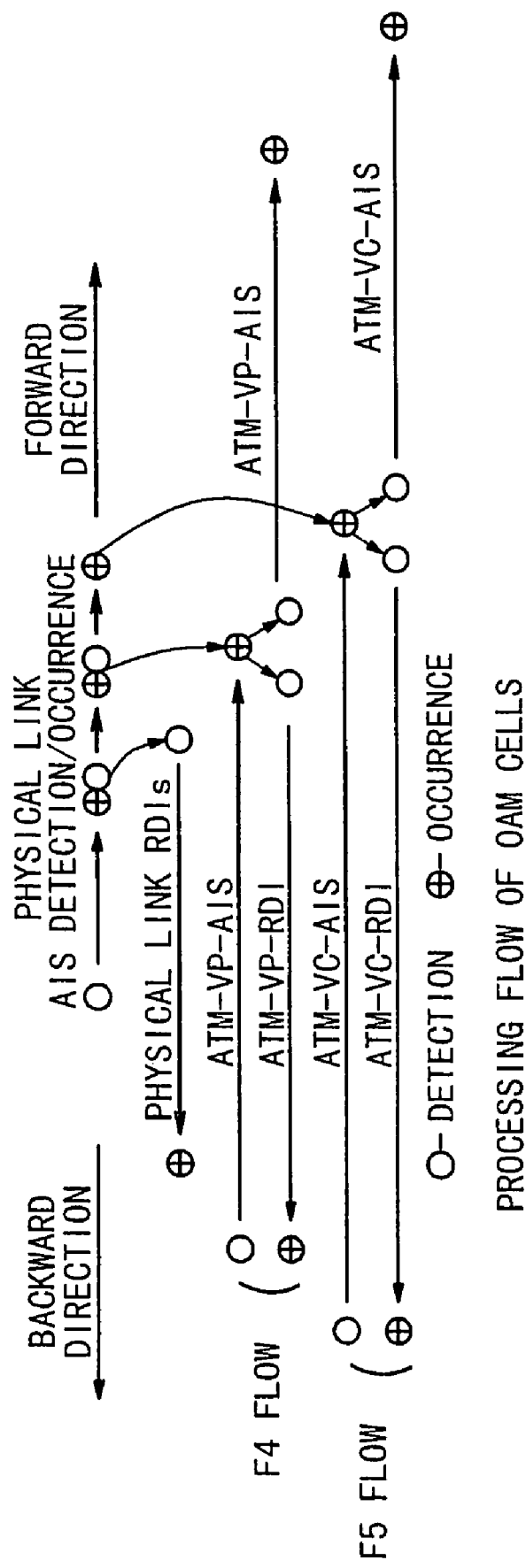

DEFINITION OF END-END
CONNECTION AND SEGMENT CONNECTION IN PVC CONNECTION

ATM CELL TRANSFER APPARATUS WITH HARDWARE STRUCTURE FOR OAM CELL GENERATION

RELATED APPLICATION

This application is a continuation of U.S. patent application Ser. No. 09/598,215 filed Jun. 21, 2000, now U.S. Pat. No. 6,868,066 the disclosure of which is incorporated herein by reference.

BACKGROUND OF THE INVENTION

1. Field of the Invention

The present invention generally relates to an ATM (Asynchronous Transfer Mode) cell transfer apparatus. More specifically, the present invention relates to an ATM cell transfer apparatus suitable for transferring an OAM (Operation And Maintenance) cell.

2. Description of the Related Art

A processing method of an OAM cell executed in an ATM cell transferring operation is defined in the specification I.610 of ITU-T (International Telecommunication Union—Telecommunication Standardization Sector). In this specification, a processing time required to transfer an OAM cell when any failure occurs is also defined. Further, an OAM cell transferring operation in PVC (Permanent Virtual Channel) is defined.

A processing operation of an OAM cell should be carried out as follows in this specification to notify the occurrence of any failure. That is, it is supposed that a receiving apparatus operates as a terminal point of either an end-end connection or a segment connection in a F4 (VP: Virtual Path) flow or a F5 (VC: Virtual Channel) flow while a cell is received. In this case, when an AIS (Alarm Indication Signal) OAM cell for either the F4(VP) flow or the F5(VC) flow is transmitted from a counter apparatus, the receiving apparatus must send back an RDI (Remote Defect Indication) OAM cell within a time period of 500 ms or transfer the AIS OAM cell in the time interval of one second in accordance with the connection.

FIG. 15 shows a definition of a terminal point of an end-end connection of an F4(VP) flow or an F5(VC) flow, or a terminal point of a segment connection of the F4(VP) flow or the F5(VC) flow. Referring to FIG. 15, when a PVC connection is actually set between apparatuses, an ATM cell signal flows through the connection in an F4(VP) flow or an F5(VC) flow. In this case, a connection point for terminating the ATM cell signal is defined as an "end point". A connection point which is arbitrarily defined by an operator of an apparatus on an end-end connection is defined as a "segment point". FIG. 15 represents these definition states. It could be considered that a segment connection point may be defined as a node point in the end-end connection or as one end node point in the end-end connection.

As types of OAM cells, there are AIS, RDI, Loop Back, Continuity Check, Performance Monitoring (PM), and so on. All of these OAM cells other than a PM OAM cell must be sent back to a counter apparatus within a certain time period, when they are received.

FIG. 14 shows a processing operation of an OAM cell. Referring now to FIG. 14, the processing operation will be described. Here, it is supposed that an ATM cell is transferred through a physical link layer from a left direction to a right direction in this drawing. In this case, the transfer direction of the ATM cell is referred to as a "signal forward direction", whereas the direction opposite to the transfer direction of the ATM cell is referred to as a "signal backward direction". For example, in case that any failure such as an LOS or an LOF (Loss Of Frame) occurs in the physical link layer, an RDI OAM cell is generated, and then is sent out in the signal backward direction.

Also, an AIS OAM cell is generated in case that any failure such as interruption of signal input, any error on a transfer path, and LOF occurs in a port for terminating a transfer path or an interface with another connection point. As described above, in case that any abnormal state is caused in the F4(VP) flow or the F5(VC) flow so that the AIS OAM cell is received, the AIS OAM cell is detected in an SDH/SONET layer as a physical layer. At this time, the AIS OAM cell is transferred in the signal forward direction. In addition thereto, an RDI OAM cell is sent back to the signal backward direction.

As above described, when the failure occurs, the sending back of the RDI OAM cell or the generation and transfer of the AIS OAM cell at the connection relaying point need to be carried out for each of the end-end connection and the segment connection with respect to a plurality of F4(VP) flows within the above port, and a plurality of F5(VC) flows within each of the plurality of F4(VP) flows.

FIG. 1 shows the structure of a conventional ATM cell transfer apparatus. A switch block is put between physical interfaces. Transfer paths on which SDH/SONET signals are transferred are connected to each of the physical interfaces. A CPU is connected to the switch block.

As shown in FIG. 1, the generating and transferring operations of the OAM cell is carried out by the CPU in the conventional ATM cell transfer apparatus. Every time an ATM cell is received, the CPU analyzes the content of the received ATM cell. Then, the CPU carries out the sending back operation of the RDI OAM cell in the F4(VP) flow or the F5(VC) flow, and the transferring operation of the AIS OAM cell based on the analyzed content. However, it is sometimes difficult that the CPU carries out all of the processing operations of the OAM cells.

Of the above described OAM cells, the OAM cell of Loop Back and the OAM cell of Continuity Check need to be sent back only when an on-demand is issued from a counter apparatus. As a result, these OAM cells of Loop Back/Continuity Check are not frequently generated or sent back while the actual ATM service operation is carried out. Therefore, the generating and sending back operations of these OAM cells may be satisfactorily carried out even by the processing operation of the CPU.

However, as shown in FIG. 14, there is a problem in the processing operation of the AIS/RDI OAM cell. As types of the processing operation, there are two types of the end-end connection and the segment connection, also there are cases that a plurality of F4(VP) flows are present in a transfer port in STM-1 and OC-3c, and furthermore, a plurality of F5(VC) flows are present in each of the F4(VP) flows.

As above described, when any failure occurs in a plurality of transfer paths or ports which have a large number of F4(VP) flows or F5(VC) flows in the PVC connection, a large amount of AIS OAM cells need to be generated within one time. In the case that all of the processing operations are carried out in a software manner by the CPU, such a large amount of AIS OAM cells can not be generated at a time as defined in the above-described I.610 specification of ITU-T. This is because the CPU determines the OAM cells one by one in accordance with a software program as to whether the OAM cells should be generated. Therefore, even when the OAM cells should be generated by the CPU, the generation timing thereof may be deviated. In the worst case, there is a possibility that this CPU itself may stop the processing operation thereof. Also, there is another possibilities that a similar unfavorable result may be caused, when a large number of AIS OAM cells are transferred from the counter apparatus in a large number of F4(VP) flows or F5(VC) flows.

To solve these problems, Japanese Laid Open Patent Application (JP-A-Heisei 9-36869) is known. In this reference, an OAM cell is not transferred based on the software processing operation carried out by the CPU, but the generation of an RDI OAM cell and the detection of the occurrence of any failure on a transfer path is carried out by a hardware circuit in response to the reception of an AIS OAM cell. Then, the generated OAM cell is sent out on a VP having a VPI (Virtual Path Identifier) value specified by a CPU.

In this reference, as shown in FIG. 2, an OAM cell is transferred from the counter apparatus and is detected by an OAM cell detecting unit (1). Then, the OAM cell having a VPI value indicative of a transfer destination is stored in a buffer (9). Also, the AIS OAM cell which should be generated when any failure occurs on the transfer path is stored into the buffer (9) after the value of the VPI register (4) is set by the CPU. The OAM cells stored in the buffer (9) are finally sent out from the OAM cell transmitting unit (10).

In this reference, the CPU does not determine and send out all of the OAM cells which should be transferred to the counter apparatus based on the given data such as input OAM cell and alarm information.

However, as the types of the OAM cells transferred from the counter apparatus, not only the VPI value but also the VC value should be considered. Also, in this conventional ATM cell transfer system, the manipulating operations for the respective OAM cells on the end-end connection or the segment connection are not considered. Further, this conventional. ATM cell transfer system does not consider which type of OAM cell should be inputted, and whether or not an OAM cell corresponding, to the inputted OAM cell should be sent back. In addition, this conventional ATM cell transfer system similarly does not consider the manipulating operation of the OAM cell when the failure occurs on the transfer path.

Moreover, in the above described conventional ATM cell transfer apparatus, in case that a plurality of F5(VC) flows are present in an F4(VP) flow, if the transferred OAM cell is the OAM cell in the F4(VP) flow, the OAM cell can not be transferred for the F5(VC) flows within the F4(VP) flow.

In conjunction with the above description, a cell output apparatus is disclosed in Japanese Laid Open Patent Application (JP-A-Heisei 4-363939). This conventional cell output apparatus is provided with a buffer (3) for storing the cell of a transfer data and buffers (4 and 5) for storing the cell having a characteristic pattern. A buffer selecting apparatus (6) refers to an output priority order reference table (14) to select any one of these buffers (3, 4 and 5). The cell stored in the selected buffer is transferred from a cell transmitting apparatus (7). In this manner, the cell output apparatus is capable of changing the data pattern of a physical layer OAM cell and the output priority order of the physical layer OAM cell without expanding the scale of the hardware.

Also, an OAM processing method at a plurality of line terminating apparatus is disclosed in Japanese Laid Open Patent Application (JP-A-Heisei 10-262064). In this conventional OAM processing method, a physical layer terminating unit (30) is connected to a plurality of lines to convert reception signals into cells. The converted cell is added at the header with a line identifier which specifies a line on which the converted cell is transferred. A header converting unit (34) converts the line identifier VPI/VCI value of the cell into an internal processing ICID. An OAM processing unit (37) collectively manages the data required for carrying out the OAM processing operations for the respective lines by using an internal processing connection management table which uses the internal processing identifier as an address. The data is read out from the management table based on the ICID of the cell received from each of the lines, and then the OAM processing operation corresponding to the line is carried out based on the read data. In this way, the plurality of lines are commonly controlled by the single OAM processing unit.

Also, an OAM cell inserting apparatus is disclosed in Japanese Patent No. 2746284. In this conventional OAM cell inserting apparatus, normal data cells are stored in a cell memory unit (30). An OAM cell is generated in response to an OAM cell output instruction before a total number of cells stored in the memory cell unit (30) is reached to a predetermined value. Thus, either of the data cell or the OAM cell is outputted. As a result, the OAM cell is outputted from the OAM inserting apparatus without any delay, if necessary.

Also, an operation maintenance cell sending circuit is disclosed in Japanese Patent No. 2851941. In this conventional cell sending circuit, a line interface unit (3) is connected to the line and a switch unit (7), and contains a physical layer terminating unit (4) and a VPI converting unit (5). Furthermore, the VPI converting unit (5) is composed of an operation maintenance sending circuit (6).

SUMMARY OF THE INVENTION

Therefore, an aspect of the present invention is to provide an ATM cell transfer apparatus having a hardware configuration which can correctly generate and transfer AIS OAM cells at timing defined in the specification I.610 of ITU-T.

Another aspect of the present invention is to provide an ATM cell transfer apparatus having a hardware configuration capable of correctly sending RDI OAM cells back to a counter apparatus in the case that a large number of AIS OAM cells for F4(VP) flows or F5(VC) flows are transferred from the counter apparatus.

Still another aspect of the present invention is to provide an ATM cell transfer apparatus having a hardware configuration by which even when a large number of RDI OAM cells are irregularly transferred from a counter apparatus for F4(VP) flows or F5(VC) flows, the RDI OAM cell transferring operation can be carried out or can be terminated.

Yet still another aspect of the present invention is to provide an ATM cell transfer apparatus having a hardware configuration by which a CPU can recognize the reception of all of AIS OAM cells and RDI OAM cells and the content of transmitted OAM cells.

It is also an aspect of the present invention to provide an ATM cell transfer apparatus having a hardware configuration capable of changing or updating the content of an OAM cell to be transmitted.

Another aspect of the present invention is to provide a data structure of a memory block and a method of accessing the memory block, which are suitably used in either of the above-described hardware configurations of the ATM cell transfer apparatus.

Still another aspect of the present invention is to provide an ATM cell transfer apparatus capable of carrying out OAM cell transferring/sending processing operations in a high efficiency by converting a format of a received OAM cell.

Yet still another aspect of the present invention is to provide an ATM cell transfer apparatus having a hardware configuration which can correctly generates and transfer an AIS OAM cell for each of a plurality of F4(VP) flows in a port, for each of a plurality of F5(VC) flows in each of the plurality of F4(VP) flows, and for each of an end-end connection and an segment connection.

In order to achieve an aspect of the present invention, an ATM (asynchronous transfer mode) cell transfer apparatus includes an input interface connected to a plurality of first transfer paths, a switch block having a plurality of input ports corresponding to the plurality of first transfer paths and a plurality of output ports, and an OAM cell processing hardware block having a memory unit. The input interface receives an SDH/SONET signal transferred to the input interface on each of the plurality of first transfer paths to output an input OAM cell corresponding to the SDH/SONET signal to one of the plurality of input ports of the switch block corresponding to the first transfer path on which the SDH/SONET signal is transferred. The switch block receives the input OAM (operation and maintenance) cell from the corresponding input port as an OAM input port to output to the OAM cell processing hardware block together with a port number of the OAM input port, and receives at least one output OAM cell from the OAM cell processing hardware block to output to at least one of the plurality of output ports based on the received output OAM cell. The OAM cell processing hardware block reads out the at least one output OAM cell corresponding to the input OAM cell from the memory unit based on the input OAM cell and the port number supplied from the switch block, and outputs the at least one output OAM cell to the switch block.

Here, the plurality of input ports may include a specific input port, and the plurality of output ports may include a specific output port. Also, the switch block may receive the input OAM cell from the OAM input port to output to the OAM cell processing hardware block through the specific output port, and receive the at least one output OAM cell from the OAM cell processing hardware block through the specific input port to output to the at least one OAM output port. The OAM cell processing hardware block may be connected to the specific input port and the specific output port in the switch block, and read out the at least one output OAM cell corresponding to the input OAM cell from the memory unit based on the input OAM cell and the port number supplied through the specific output port of the switch block, and output the read out output OAM cell to the specific input port of the switch block.

In this case, when the input OAM cell is an AIS (alarm indication signal) OAM cell, the OAM cell processing hardware block desirably reads out an RDI (remote defect indication) OAM cell and an AIS OAM cell as the at least one output OAM cell from the memory unit, and outputs the read out RDI OAM cell and AIS OAM cell to the specific input port of the switch block. Also, when the input OAM cell is an RDI OAM cell, the OAM cell processing hardware block desirably reads out an RDI OAM cell as the at least one output OAM cell from the memory unit, and outputs the read out RDI OAM cell to the specific input port of the switch block.

Also, the input OAM cell supplied to the OAM input port has a standard format defined by I.610 of ITU-T, and the port number of the OAM input port is written in an HEC field of the standard format of the input OAM cell supplied from the specific output port to the OAM cell processing hardware block.

Also, the input interface may generate a port failure signal when a failure occurs in any one of the plurality of first transfer paths or inside of the input interface, and outputs the port failure signal to the OAM cell processing hardware block. At that time, the OAM cell processing hardware block generates a plurality of the output OAM cells based on the port number of the port in which the port failure has occurred, and outputs the plurality of output OAM cells to the specific input port of the switch block.

Also, the at least one output OAM cell is previously written into the memory unit.

Also, it is desirable that the memory unit includes as the at least one output OAM cell: data indicative of whether an RDI OAM cell has been received as the input OAM cell; data indicative of whether or not the output OAM cell has been sent out; data indicative of whether or not an F4(VP: virtual path) flow is valid; data indicative of whether or not an AIS OAM cell or RDI OAM cell in the F4(VP) flow has been sent out; data indicative of whether or not an F5(VC: virtual channel) flow is valid; data whether or not an AIS OAM cell or RDI OAM cell in the F5(VC) flow has been sent out; data indicative of a port number for the output OAM cell to be outputted; data indicative of an output VPI value; and data indicative of an output VCI value to be outputted.

In order to achieve another aspect of the present invention, an ATM cell transfer apparatus includes a switch block having a plurality of input ports containing a specific input port and a plurality of output ports containing a specific output port, and an OAM cell processing hardware block. The switch block outputs an input OAM (operation and maintenance) cell supplied to an OAM input port as any one of the plurality of input ports other than the specific input port to the specific output port together with a port number of the OAM input port, and outputs an. output OAM cell supplied from the specific input port to a determined one of the plurality of output ports other than the specific output port. The hardware processing hardware block includes a first input storage unit which temporarily stores the input OAM cell and the port number and outputs the stored input OAM cell and the port number, a memory unit which stores output OAM cell, and outputs the output OAM cell based on address data, the address data being supplied from the first input storage unit to the memory unit based on the input OAM cell and the port number, and an output storage unit which temporarily stores the output OAM cell outputted from the memory unit, and outputs the stored output OAM cell to the specific input port of the switch block.

The OAM cell processing hardware block may further includes a second input storage unit which temporarily stores a failure port number of a port related toga port failure when the port failure is detected, and outputs the stored failure port number to the memory unit, and a selecting unit which selects one of the failure port number from the second input storage unit and a set of the input OAM cell and the port number to output as the address data to the memory unit.

In this case, the address data may include data indicative of whether or not the input OAM cell is an AIS OAM cell; the port number; a VPI value; a VCI value; and a data indicative of whether the ATM cell transfer apparatus is a terminal point node of a segment connection or an end-end connection.

Also, the ATM cell transfer apparatus may further includes a software executing unit connected to the OAM cell processing hardware block, to access the OAM cell processing hardware block. In this case, the software executing unit may previously writes the output OAM cell into the memory unit. Also, the software executing unit may access the OAM cell processing hardware block to recognize that the input OAM cell is stored in the memory unit. Also, the hardware processing block may output the OAM cell stored in the memory unit to the software execution unit in response to a read command issued from the software execution unit. The OAM cell processing hardware block may change the output OAM cell stored in the memory unit in response to a write command issued from the software execution unit. Moreover, the OAM cell processing hardware block may further includes an address generating circuit section continuously generating the address data such that the output OAM cell which are stored in the memory unit are continuously outputted.

Also, the memory unit primarily determines the output OAM cell based on the address data. In this case, the memory unit desirably stores, as the output OAM cell:

data indicative of whether or not an RDI OAM cell is received as the input OAM cell;

data indicative of whether the output OAM cell has been read out or being read out;

data indicative of whether or not an F4(VP) flow is valid;

data indicative of whether or not an AIS OAM cell or RDI OAM cell in the F4(VP) flow has been sent out;

data indicative of whether or not an F5(VC) flow is valid;

data whether or not an AIS OAM cell or RDI OAM cell in the F5(VC) flow has been sent out;

data indicative of a port number for the output OAM cell to be outputted;

data indicative of a VPI value to be outputted; and data indicative of an output VCI value to be outputted.

In order to achieve still another aspect of the present invention, an ATM cell transfer apparatus includes a memory unit which stores an output OAM cell corresponding to an input OAM cell which is supplied from each of a plurality of input ports, a memory area of the memory unit being composed of a plurality of data segment areas for storing a plurality of OAM cells, and an access unit which accesses the memory unit.

Here, the memory area of the memory unit may be divided into a first area for AIS OAM cells and a second area for RDI OAM cells. Each of the first area and the second area may be divided into port areas in correspondence with the plurality of input ports. Further, each of the port areas may be divided into VPI areas for VPI values respectively allocated to the plurality of input ports, and each of the VPI areas corresponds to one data segment area.

In this case, it is desirable that each of the data segment areas stores:

data indicative of whether or not an RDI cell has been received;

data indicative of whether or not an OAM cell has been sent out;

data indicative of whether or not an F4(VP) flow is valid;

data indicative of whether or not an AIS OAM cell or RDI OAM cell in an F4(VP) flow has been sent out;

data indicative of whether or not an F5(VC) flow is valid;

data indicative of whether or not an AIS OAM cell or RDI OAM cell in the F5(VC) flow has been sent out;

an output port number;

a VPI value to be outputted; and a VCI value to be outputted.

Also, the access unit may execute an internal access operation based on an internally generated access control signal, and an external access operation based on an externally supplied access control signal. Also, one ATM cell time may be divided into a time period for the internal access operation and a time period for the external access operation. Also, the internal access operation time period may be composed of an internal read access time period and an internal write access time period, and the external access operation time period may be composed of an external read access time and an external write access time. In this case, the output OAM cell corresponding to the input OAM cell supplied from each of the plurality of input ports may be updated during the internal write access time period. Also, the output OAM cell corresponding to the input OAM cell may be read out from the memory unit during the internal read access time. The access unit may output the respective addresses of the memory areas of the memory unit to the memory unit every the one ATM cell time. Also, during the external read access time, data indicative of whether or not the input OAM cell has been received, and data indicative of whether or not the output OAM cell has been read out from the memory unit are outputted in response to an external address and an external access control signal. In addition, during the external write access time, the output OAM cell stored in the memory unit is rewritten in response to an external data, a supplied external address and the external access control signal.

BRIEF DESCRIPTION OF THE DRAWINGS

FIG. 3 is a block diagram showing the structure of an ATM cell transfer apparatus according to a first embodiment of the present invention;

FIG. 6A is a diagram showing a standard format of an OAM cell, and FIG. 6B is a diagram showing a format of an OAM cell supplied to the OAM cell processing block;

FIGS. 7A to 7D are diagrams showing an address map of an SRAM memory block provided in the OAM cell processing block of FIGS. 4A and 4B;

FIGS. 9A to 9C are timing charts showing that one ATM cell time is divided into an internal access time and an external (CPU) access time;

FIGS. 10A to 10D are timing charts showing address generation carried out when any failure occurs in a port or an F4(VP) flow;

FIGS. 11A and 11B are flow charts showing a control flow of an OAM cell processing operation of the ATM cell transfer apparatus in the first embodiment of the present invention;

FIG. 12 is a flow chart showing another control flow of the OAM cell processing operation of the ATM cell transfer apparatus in the first embodiment of the present invention;

FIG. 14 is a diagram showing an OAM cell processing operation in a physical layer link;

DESCRIPTION OF THE PREFERRED EMBODIMENTS

Figure 1:
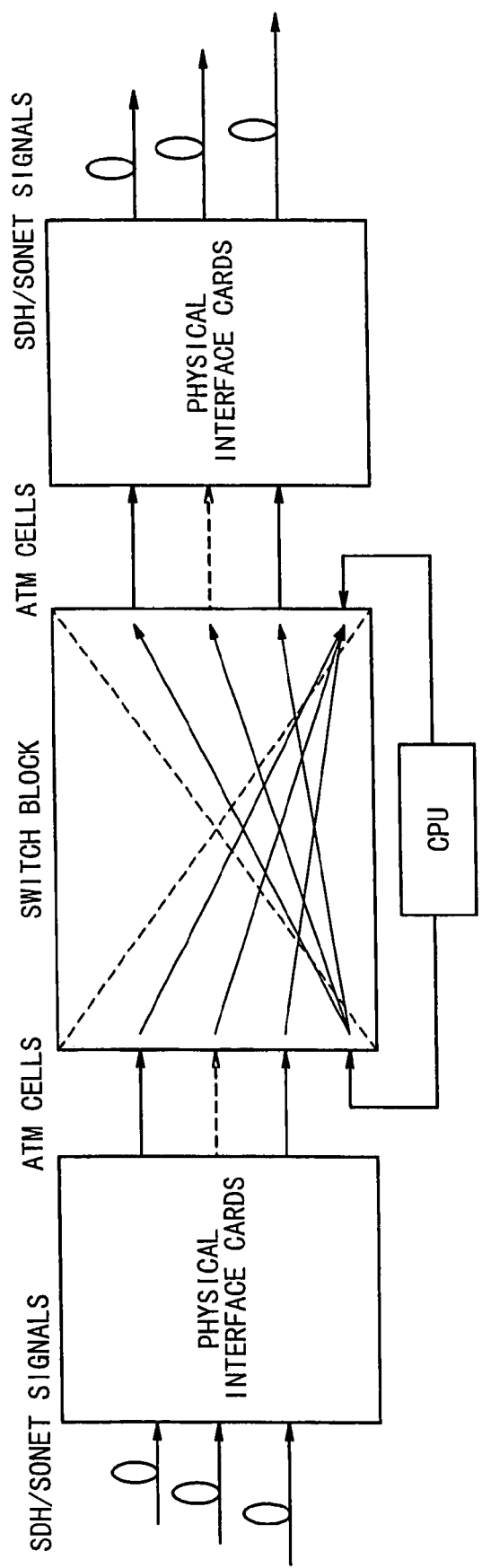
FIG. 1 is a diagram showing the structure of a conventional ATM cell transfer apparatus in which an OAM cell processing operation is carried out by software.
Figure 2:
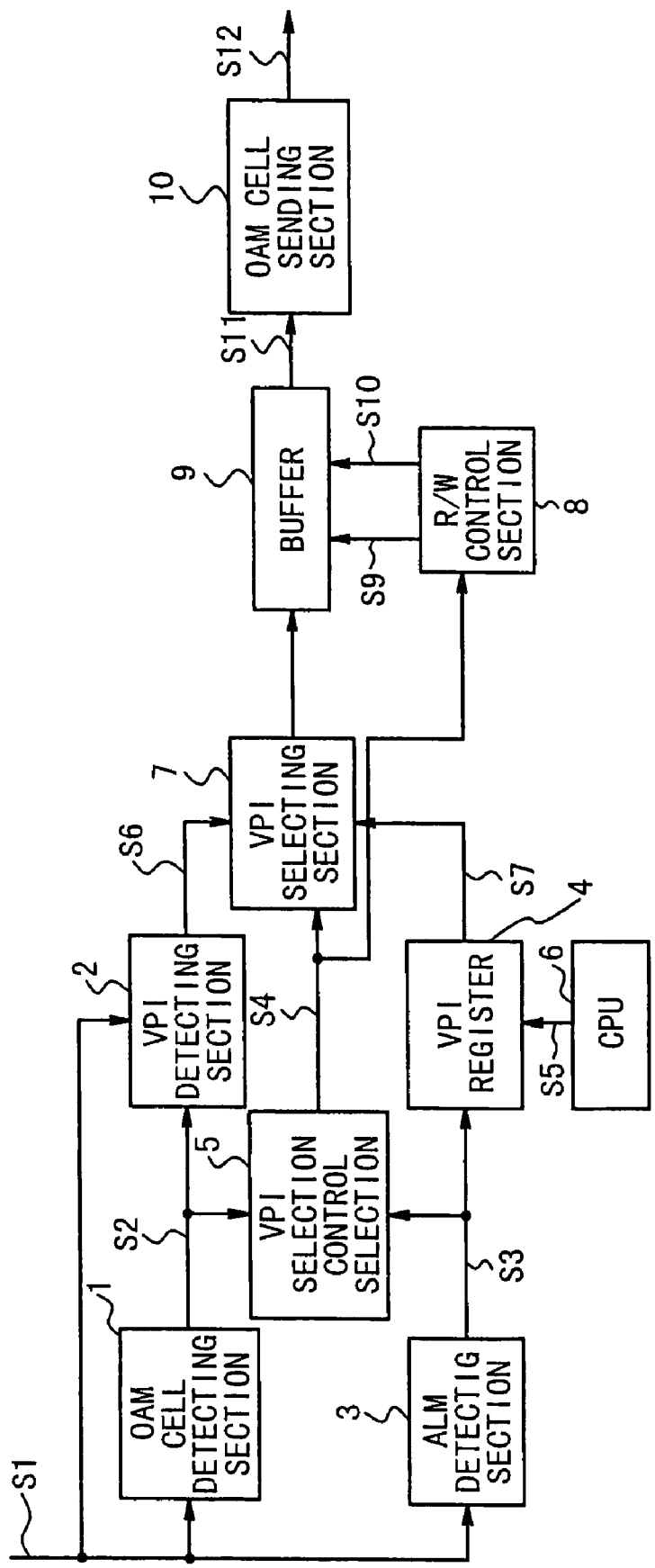
FIG. 2 is a diagram showing the structure of another conventional ATM cell transfer apparatus.

Hereinafter, an ATM (Asynchronous Transfer Mode) cell transfer apparatus of the present invention will be described below in detail with reference to the attached drawings.

FIG. 3 shows the structure of the ATM cell transfer apparatus according to the first embodiment of the present invention. Referring to FIG. 3, the ATM cell transfer apparatus in the first embodiment is composed of a physical interface block 2, a switch block 4, an OAM cell processing block 5, a CPU block 6, and a physical interface block 11.

The physical interface block 2 is connected to a plurality of transfer paths, and receives a plurality of SDH/SONET signals S1-1 to S1-$n$ ($n$ is a natural number) having ATM cells as payloads. The SDH/SONET signal is a standard interface signal between apparatuses and has the basic transfer rate of 155 Mb/s or 622 Mb/s. The physical interface block 2 transfers ATM cells S3-1 to S3-$n$ to corresponding signal ports of the switch block 4. Thus, the overhead of each SDH/SONET signal is terminated there. Also, when any failure such as an interruption of an input and LOF occurs in any of the physical ports, the physical interface block 2 outputs a port failure signal S9 indicative of occurrence of the failure to the OAM cell processing block 5.

FIG. 6A shows the format of the OAM cell standardized by ATM Forum UNI 3.1. The OAM cell format is composed of a 5-byte ATM cell header and a 48-byte cell payload.

The ATM cell header is composed by a GFC (generic flow control) field, a VPI (virtual path identifier) field, a VCI (virtual channel identifier) field, a PTI (payload type identifier) field, a CLP (call loss priority) field, and an HEC field. The cell payload is composed of an OAM cell type field, a function type field, a function specify field, a reserved field, and a CRC-10 field.

In case of an F4(VP) flow, a VCI value has the value of "3" with respect to a segment connection, and also has the value of "4" with respect to an end-end connection. Also, in case of an F5(VC) flow, a PTI value has the value of "4" with respect to the segment connection, and also has the value of "5" with respect to the end-end connection. In an OAM cell, the data of "0001" is written into an OAM cell type field. Also, the data of "0000" is written in the function type field of an AIS OAM cell, and the data of "0001" is written in the function type field of an RDI OAM cell.

The switch block 4 carries out processing operations including a switching operation of an ATM cell between ports and a multi-casting operation. Also, at this time, the switch block 4 generates an SOC (start of cell) signal. After an SDH/SONET signal is received from the physical interface block 2 and is terminated, transmission and reception of the signal between the physical interface block 2 and the switch block 4 is carried out at the transfer rate of approximately 19 Mb/s. This is because a serial signal inputted to the physical interface block 2 is converted in an 8-bit parallel signal. The switch block 4 collects OAM cells having an OAM cell format from each of the input ports to output to a predetermined specific port A. Each of these collected OAM cells S7 is outputted to the OAM cell processing block 5 together with an input port number (Port #) of the input port to which the OAM cell is inputted. At this time, the SOC signal is similarly outputted to the OAM cell processing block 5. In this case, as shown in FIG. 6B, the port number (Port #) is previously embedded into the HEC field of the format of the standard OAM cell shown in FIG. 6A, and then the cell with the port number is outputted from the switch block 4.

The CPU block 6 includes a CPU (not shown) and outputs a CPU read signal, a CPU write signal, a CPU address, and CPU data to the OAM cell processing block 5. The CPU block 6 writes the CPU data into the OAM cell processing block 5, and receives the CPU data from the OAM cell processing block 5.

The OAM cell processing block 5 receives an OAM cell, an SOC signal indicative of the head of this OAM cell, and a failure port number from the switch block 4. Also, the OAM cell processing block 5 receives a CLK signal having a frequency of 19 MHz is generated by a clock signal generating circuit (not shown). The clock signal is synchronized with the OAM cell signal. Also, the OAM cell processing block 5 receives a port failure signal S9 from the physical interface block 2. Also, the OAM cell processing block 5 receives the CPU read signal, the CPU write signal, the CPU address, and the CPU data from the CPU block 5.

The OAM cell processing block 5 carries out a predetermined processing operation to the received OAM cell based on the SOC signal, the failure port number, the port failure signal S9, the CPU read signal, the CPU write signal, the CPU address, and the CPU data in synchronous with the CLK signal. Thereafter, the OAM cell processing block 5 outputs a processed OAM cell S8 to a predetermined specific input port B of the switch block 4. Also, the OAM cell process block 5 outputs data related to the transmission and reception of the OAM cell to the CPU block 6.

FIG. 6B shows a format of an OAM cell outputted from the OAM cell processing block 5. The OAM cell format is basically identical to the format shown in FIG. 6A. A different point of the OAM cell format of FIG. 6B from that of FIG. 6A is in that an output port number (Port #) of the OAM cell is written in the HEC field of the ATM cell header. Similar to other ATM cells, the switch block 4 allocates the OAM cell to the output port based on the format shown in FIG. 6B, and then outputs the allocated OAM cell as any of signals S10-1 to S10-$n$ to the physical interface block 11.

The physical interface block 11 carries out a processing operation of an SDH/SONET frame to each of the ATM cells and OAM cells supplied from the switch block 4. At this time, the physical interface block 11 adds an HEC byte to the HEC field instead of the output port number to output as standard ATM cells S12-1 to S12-$n$.

In this way, the input OAM cells having the standard format shown in FIG. 6A are collected from all of the input ports in the physical interface block 2 shown in FIG. 3 to a specific port "A" of the switch block 4. The collected OAM cells are transferred as a signal. S7 to the OAM cell processing block 5 together with the failure port numbers and the SOC (Start Of Cell) signals indicative of the head of each OAM cell. Also, the CLK signal having the frequency of 19 MHz synchronized with the OAM cells is supplied to the OAM cell processing block 5.

Figure 4A:
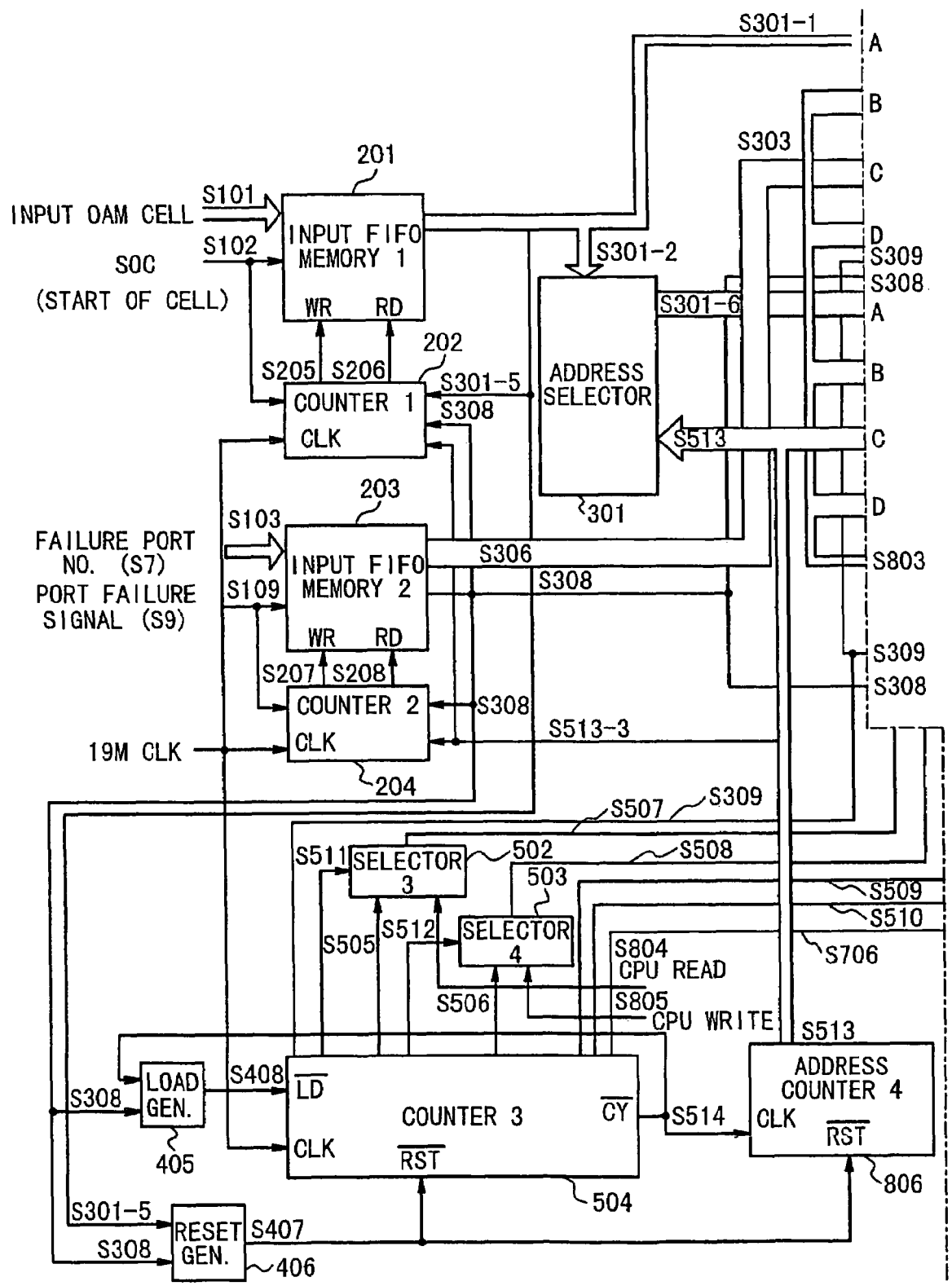
FIGS. 4A and 4B are block diagrams showing the structure of an OAM cell processing block in the ATM cell transfer apparatus according to the first embodiment of the present invention.
Figure 4B:
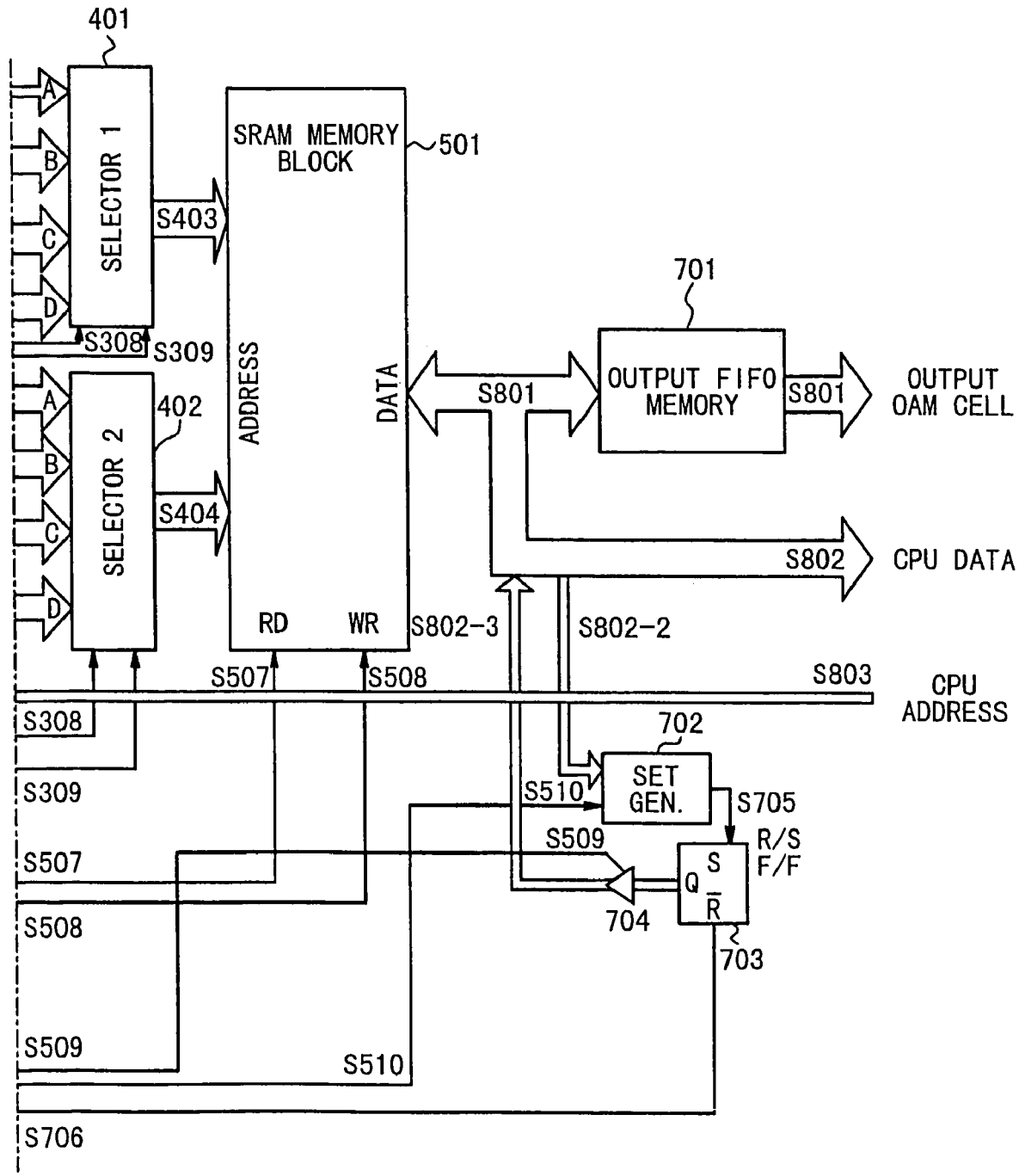

At this time, as shown in FIG. 6B, the output port number (Port #) indicative of the output port of the OAM cell is previously embedded in the HEC field of the standard format of the OAM cell shown in FIG. 6A. Such a cell is received from the switch block 4 and then is transferred to the OAM cell processing block 5. Also, the port failure signal S9 indicative of any failure such as an interruption of an input and LOF of a physical port is received from the physical interface block 2 and outputted to the OAM cell processing block 5. Various types of data required for the processing operation of the OAM cell having the standard format are written into the OAM cell processing block 5. For example, the data includes a physical output port number indicative of an output port of the OAM cell, a VPI value, a VCI value, and a data indicative of whether the OAM cell is an AIS OAM cell or an RDI OAM cell. Also, the data includes a data indicative of whether the OAM cell is related to a segment connection or an end-end connection, and a data indicative of a port number when a failure occur at a physical port FIGS. 4A and 4B are block diagrams showing the detailed structure of the OAM cell processing block 5. Referring now to FIGS. 4A and 4B, the OAM cell processing block 5 in the first embodiment is mainly composed of an input FIFO memory (1) 201, a counter (1) 202, an input FIFO memory (2) 203, a counter (2) 204, and an address selector 301. The OAM cell processing block 5 is further composed of a selector (1) 401, a selector (2) 402, a load signal generating circuit 405, a reset signal generating circuit 406, and an SRAM memory block 501. The OAM cell processing block 5 is further composed of a selector (3) 502, a selector (4) 503, a counter (3) 504, an output FIFO memory 701, a set signal generating circuit 702, a flip-flop 703, a three-state buffer 704, and an address counter 806.

Figure 5:
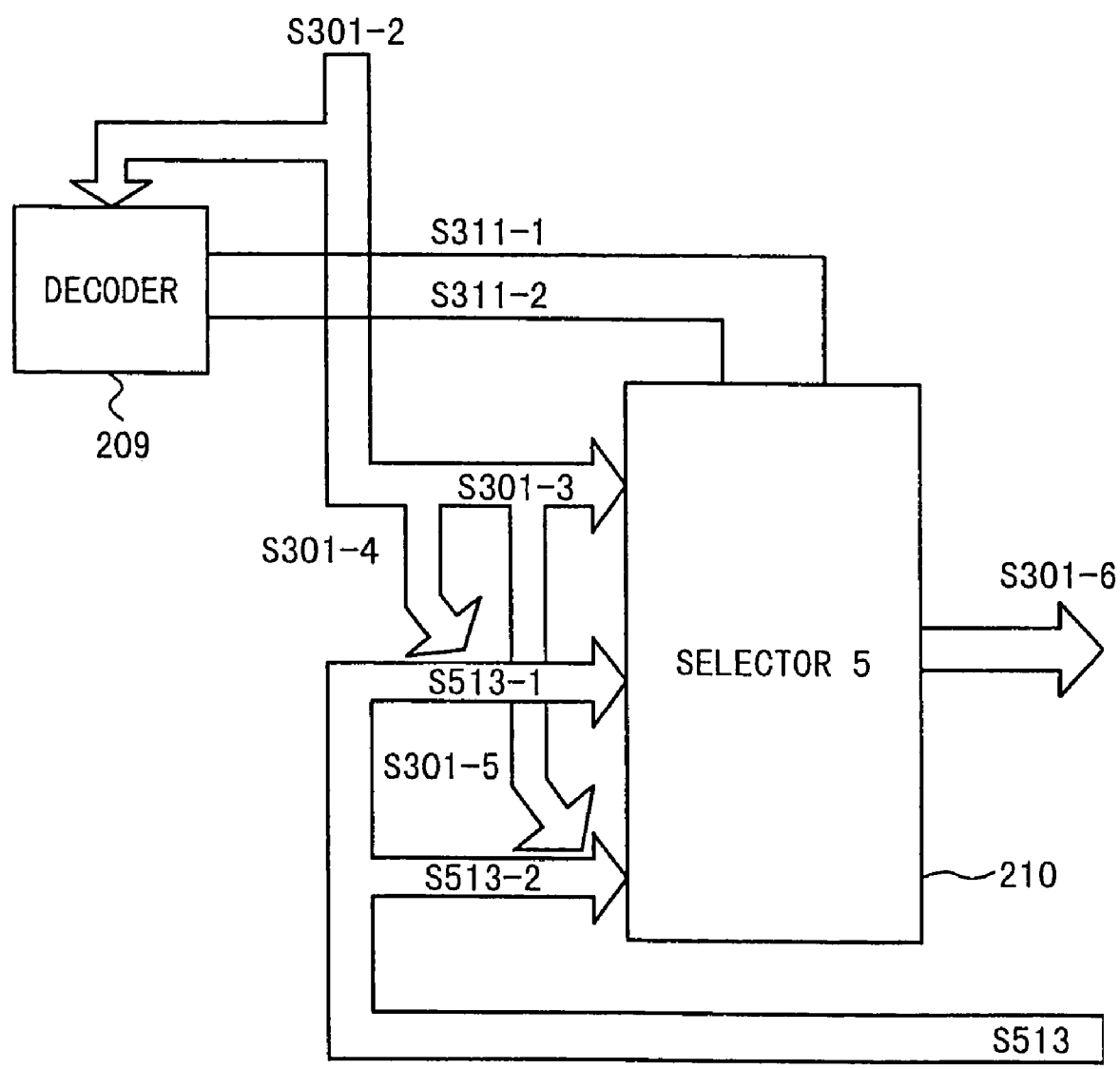
FIG. 5 is a block diagram showing the structure of address selector of the OAM cell processing block in the ATM cell transfer apparatus according to the first embodiment of the present invention.

FIG. 5 is a block diagram showing the detailed structure of the address selector 301. Referring now to FIG. 5, the address selector 301 is composed of a decoder 209 and a selector (5) 210.

The input FIFO memory (1) 201 receives an OAM cell S101 from the switch block 4 in response to a write control signal S205 based on the SOC signal S102 and then stores data of a portion of the received OAM cell. Specifically, the data required to process the OAM cell are stored. That is, the data include a physical port number for the OAM cell to be received, a VPI value, and a VCI value. The data also include a data indicative of whether the OAM cell is an AIS OAM cell or an RDI OAM cell, and a data indicative of whether the OAM cell is related to a segment connection or an end-end connection. Also, in response to a read control signal S206, the input FIFO memory (1) 201 outputs the stored data S301 to the decoder 209, the selector (1) 401, and the selector (5) 210. Also, the input FIFO memory (1) 201 outputs a signal S301-5 as a part of the output signal S301 to the counter (1) 202 and the reset signal generating circuit 406.

The counter (1) 202 inputs the data S301-5 outputted from the input FIFO memory (1) 201, an signal S308 outputted from the input FIFO memory (2) 203, the SOC signal S102, the CLK signal S104, and a signal S513-3 as a part of a signal outputted from the address counter 806. Thus, the counter (1) 202 generates the write control signal S205 and the read control signal S206 to the input FIFO memory (1) 201.

The input FIFO memory (2) 203 inputs and temporarily stores a data S103 indicative of the failure port number based upon the port failure signal S109 and a write control signal S207 supplied from the physical interface block 2. The failure port number indicates the number of the port where any failure such as input interruption and LOF (Loss Of Frame) has occurred at the interface of the SDH/SONET signal. Also, the input FIFO memory (2) 203 outputs the stored data S308 to the selector (1) 401 in response to a read control signal S208. Also, the input FIFO memory (2) 203 generates a signal S308, and outputs the generated signal S308 to the counter (1) 202, the counter (2) 204, the load signal generating circuit 405, the reset signal generating circuit 406, the selector (1) 401, and the selector (2) 402.

The data is read out from the input FIFO memory 1 so that an address S301 (l) is generated which is used as an address "A" when the SRAM memory block 501 is accessed. The address "A" is composed of 20 bits in total. That is, the address "A" is composed of a bit indicative of whether the received OAM cell is an AIS OAM cell or an RDI OAM cell (1 bit), a port number for the OAM cell to have been received (5 bits), a VPI value (either 8 bits or 4 bits), and a VCI value (either 5 bits or 9 bits). The address "A" is further composed of a bit indicative of whether the OAM cell is related to a segment connection or an end-end connection (1 bit). The data is read from the input FIFO memory (2) 203 so that another address S303 is generated which is used as an address C when the SRAM memory block 501 is accessed. In the address "C", "0" is written as a bit indicative of whether the received OAM cell is an AIS OAM cell or an RDI OAM cell (1 bit). The address "C" is further composed of a port number (5 bits) of the port where the OAM cell is reached.

The counter (2) 204 inputs the port failure signal S105 from the physical interface block 2, the CLK signal S104, the data S308 outputted from the input FIFO memory (2) 203, and a part S513-3 of an output signal S513 from the address counter 806. Thus, the counter (2) 204 generates the write control signal S207 and the read control signal S208 to the input FIFO memory (2) 203.

The decoder 209 inputs a part S301-2 of the output signal S301 of the input FIFO memory (1) 201 to decode the output signal S301-2. Selection control signals S311-1 and S311-2 are generated based upon the decoded result, and then are supplied to the selector (5) 210.

In response to the selection control signals 311-1 and 311-2, the selector (5) 210 selects any one of a part S301-3 of the signal 301 outputted from the input FIFO memory (1) 201, a combination of a part of a signal S513-1 outputted from the address counter 806 and a part S301-4 of a signal S301 outputted from the input FIFO memory (1) 201, and another combination of a part S513-2 of a signal S513 outputted from the address counter 806 and a part S301-5 of the signal 301 outputted from the input FIFO memory (1) 201. Then, the selector (5) 210 outputs a signal S301-6 as a lower address "A" to the selector (2) 402.

Based upon the signal S309 outputted from the counter (3) 504 and the signal S308 outputted from the input FIFO memory (2) 203, the selector (1) 401 selects any one of a part S301-1 of the signal S301 supplied from the input FIFO memory (1) 201 as an upper address "A", a CPU address signal S803 outputted from the CPU block 6 as upper addresses "B" and "D", and the signal S306 outputted from the input FIFO memory (2) 203 as an upper address "C". Then, the selector (1) 401 outputs the selected signal as a memory address signal S403 to the SRAM memory block 501.

Based upon the signal S309 outputted from the counter (3) 504 and the signal S308 outputted from the input FIFO memory (2) 203, the selector (2) 402 selects any one of the signal S301-6 outputted from the selector (5) 210 as a lower address "A", the CPU address signal S803 outputted from the CPU block 6 as lower addresses "B" and "D", and the signal S513 output from the address counter 806 as a lower address "C". Then, the selector (2) 402 outputs the selected signal as a memory address signal S404 to the SRAM memory block 501.

The load signal generating circuit 405 inputs the output S514 of the counter (3) 504 and the output signal S308 of the input FIFO memory (2) 203 to generate a load signal S408. Then, the load signal generating circuit 405 supplies the load signal S408 to the counter (3) 504.

The reset signal-generating circuit 406 inputs a part S301-5 of an output signal S301 from the input FIFO memory (1) 201 and the output signal S308 of the input FIFO memory (2) 203 to generate a reset signal S407. Then, the reset signal generating circuit 406 supplies the reset signal S407 to the counter (3) 504 and the address counter 806.

The counter (3) 504 is a 1/53-frequency-dividing counter, and generates an access timing control signal for controlling timings when the input FIFO memories 201 and 203 and the CPU access the SRAM memory block 501. In this manner, the counter (3) 504 divides the access timings between the CPU and the FIFO memories 201 and 203 such that the CPU can freely change the contents of the OAM cell to be sent out.

The counter (3) 504 is reset by the reset signal generated by the reset signal processing circuit 406. In response to the load signal S408, the counter (3) 504 inputs the clock signal S104 having the frequency of 19 MHz, and then frequency-divides the clock signal S104 by 53. Thus, there are outputted the signal S309, a signal S511, a signal S505, a signal S512, a signal S508, a signal S509, a signal S706, and a signal S514 which are obtained through the frequency division. Both of the signal S511 and the signal 505 are supplied to the selector (3) 502, and both of the signal S506 and the signal S507 are supplied to the selector (4) 503. The signal S510 is supplied to the set signal generating circuit 702. The signal S706 is supplied to the R/S flip-flop 703. The signal S514 is supplied to the address counter 806 and the load signal generating circuit 405.

The address counter 806 inputs the signal S514 as a clock signal from the counter (3) 504 to generate the address signal S513. Then, the address counter 806 supplies the address signal S513 to the selector (2) 402, the selector (1) 401 and the selector (5) 210. A part of the address signal S513-3 is supplied to both of the counter (1) 202 and the counter (2) 204.

The selector (3) 502 selects one of the signal S505 outputted from the counter 3 and the CPU read signal S804 based upon the signal S511 outputted from the counter 3. Then, the selector (3) 502 outputs the selected signal as the signal S507 to the SRAM memory block 501.

The selector (4) 504 selects one of the signal S506 outputted from the counter 3 and the CPU write signal S805, and then outputs the selected signal as the signal S508 to the SRAM memory block 501.

The set signal generating circuit 702 inputs a part S802-2 of the CPU data, and outputs a set signal S705 to the R/S flip-flop 703 in response to the signal S510 supplied from the counter (3) 504.

The R/S flip-flop 703 is set in response to the signal S705 supplied from the set signal generating circuit 702, and is reset in response to the signal S706 supplied from the counter (3) 504. The Q output of the R/S flip-flop 703 is supplied to the tri-state gate 704. The tri-state gate 704 outputs the Q output of the R/S flip-flop 703 as a part S802-3 of the CPU data in response to the signal S509 outputted from the counter (3) 504.

The SRAM memory block 501 receives both of the memory address signal S403 outputted from the selector (1) 401 and the memory address signal S404 outputted from the selector (2) 402. Also, the SRAM memory block 501 receives the output signal S507 of the selector (3) 502 as the read control signal to output the data S601 as the CPU data S802, and to output the data S601 to the output FIFO memory 701. Further, the SRAM memory block 501 receives the output signal S508 of the selector (4) 503 as the write control signal, and also receives the CPU data 802 as the write data S601.

The output FIFO memory 701 inputs the data S601 and outputs an output OAM cell S801. In the manner, the output FIFO memory 701 temporarily stores the OAM cell read out from the SRAM memory 501.

Next, an operation of the ATM cell transfer apparatus according to the first embodiment of the present invention will now be described.

First, an example of an environment to which the ATM cell transfer apparatus of the present invention is applied will be described.

Figure 16:
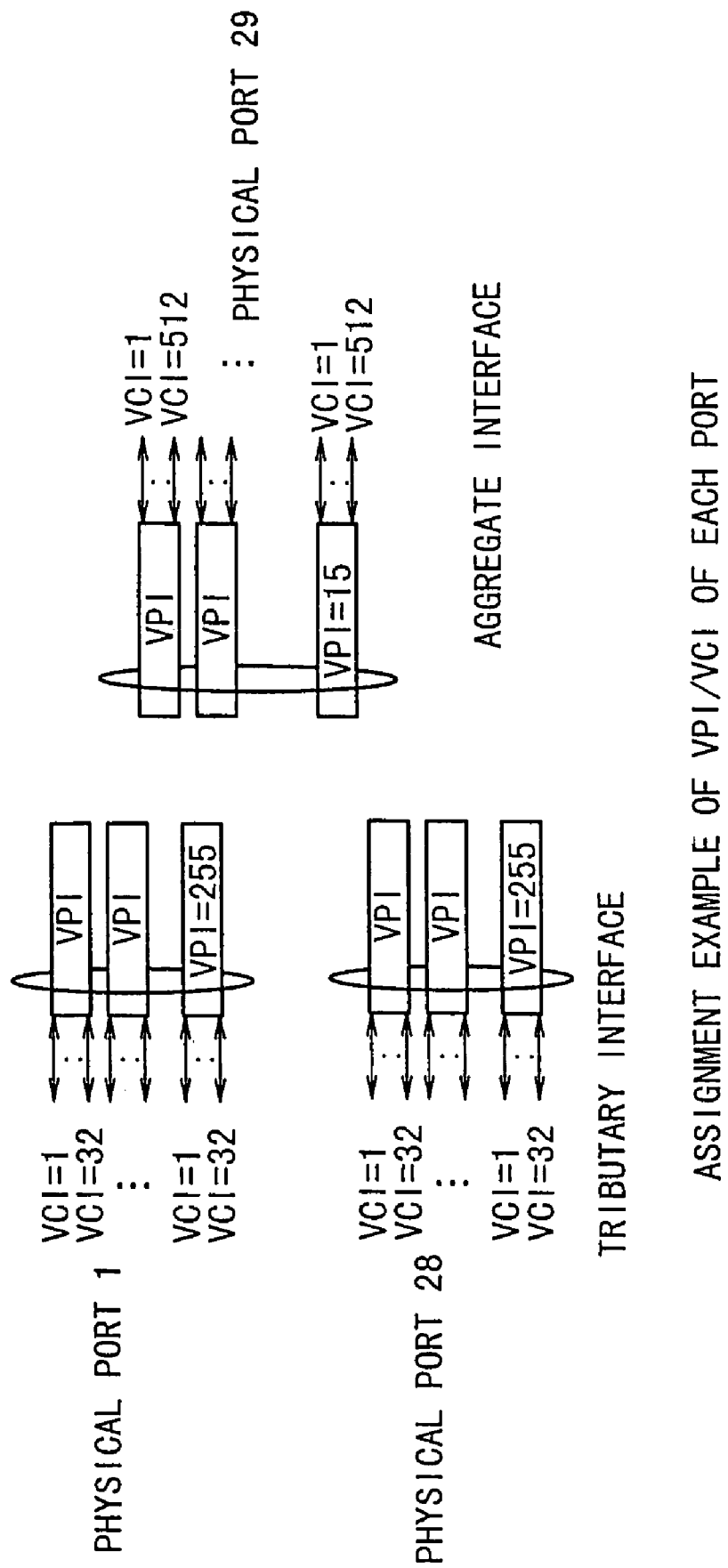
FIG. 16 is a diagram showing an allocation of VPI/VCI with respect to the respective ports.

The present invention may be applied not only to a system structure that all of input/output signals are symmetric with each other, but also another system structure as shown in FIG. 16. Referring now to FIG. 16, there are 29 ports as physical interface ports, the port 1 through the port 28 are allocated to tributary interfaces (155 Mb/s), and the port 29 is allocated to an aggregate interface (622 Mb/s). In principle, signals are multiplexed from either of the tributary interfaces to the aggregate interface, and conversely, a multiplexed signal is demultiplexed from the aggregate interface to any of the tributary interfaces (total throughput of system becomes approximately 5 Gb/s).

In FIG. 16, VPI/VCI values are allocated as follows. That is, the VPI values of 0 to 255 (8 bits) are allocated to the respective physical interface ports 1 to 28 of the tributary interfaces, and the VCI values of 1 to 32 (5 bits) are allocated to each of the VPI values. Also, the VPI values of 0 to 15 (4 bits) are allocated to the physical interface port 29 of the aggregate interface, and the VCI values of 1 to 512 (9 bits) are allocated to each of the VPI values.

In this example, a total number of connections provided on the side of the tributary interfaces is equal to 32×256×29=229,376, whereas a total number of connections provided on the side of the aggregate interface is equal to 512×16=8,192. As a result, an effective number of connections from the tributary interfaces to the aggregate interface is equal to 8,192 at maximum.

The ATM cells having the VCI values of 0 to 31 among the ATM cells which are inputted from a counter apparatus to the physical interface block 2 of the ATM cell transfer apparatus and which are outputted from the physical interface block 2 to the external apparatus are reserved by the international standardization organizers (ITU-T and ATM Form), and therefore, cannot be freely utilized.

However, in the present invention, for the sake of easy understanding, the VCI values of 32 to 61 are read as the VCI values of 1 to 31. Also, the ATM OAM cell having the VCI value of "3" for segment connection, and "4" for end-end connection in the F4(VP) flow is read as VCI=0 in the ATM OAM cells which are inputted from the counter apparatus to the ATM cell transfer apparatus in the PVC (Permanent Virtual Channel) connection on the side of the tributary interfaces.

Similarly, in the PVC (Permanent Virtual Channel) connection on the side of the aggregate interface, the VCI values of "32" to "543" are read as the VCI values of 1 to 512. Also, the ATM OAM cell having the VCI value of "3" for a segment connection and "4" for an end-end connection in the F4(VP) flow is read as the VCI value of "0" in the ATM OAM cells which are inputted from the counter apparatus to the ATM cell transfer apparatus of the present invention.

Next, a memory map of the SRAM memory block 501 will now be described in detail with reference to FIGS. 7A to 7D and FIGS. 8A and 8B. FIGS. 7A to 7D show the detailed memory structure of the SRAM memory block 501 from the entire structure to the respective data segments. In the example, "32" ports are present. It is now supposed that the ports PORT#1 to PORT#28 are the tributary interfaces, and the ports PORT#29 to PORT#32 are the aggregate interfaces.

FIG. 7A shows an address map of the entire memory structure. In the case, the SRAM memory has addresses from 00000 to FFFFF in the hexadecimal notation. Each of these addresses has a data segment having a 28-bit width of D0 to D27. The OAM cell data to be outputted are previously written into the respective addresses of the SRAM memory block 501. In other words, when the ATM cell transfer apparatus of the present invention, is initiated, or the CPU block 6 is not busy, the data predetermined for every address is written into the SRAM memory block 501 by the CPU block 6.

As shown in FIG. 7B, the entire memory area of the SRAM memory block 501 is divided into a memory area used to receive an RDI OAM cell, and another memory area used to transmit an AIS/RDI OAM cell. Each of the memory area used to receive the RDI OAM cell and the memory area used to transmit the AIS/RDI OAM cell are further divided for every port. For instance, it is supposed that the switch block 4 of FIG. 3 has the throughput of 5 Gb/s, and can store "32" SDH/SONET signals which have the throughput of 155 Mb/s. In this case, each of an upper half memory area and a lower half memory area in the SRAM memory block 501 is divided in correspondence with the "32" ports. As shown in FIG. 7B, a memory area of the SRAM memory block 501 used when an AIS OAM cell is received or a port failure occurs is an area for the ports PORT#1 to PORT#32 in the lower half memory area. Another memory area used when an RDI OAM cell is received is an area for the ports PORT#1 to #32 in the upper half memory area.

Also, it is supposed in FIG. 7C that the VPI value has any of the values of "0" to "255" for each of the ports PORT#1 to Port#28. Also, it is supposed in FIG. 7D that the VPI value has any of the values of "0" to "15" for each of the ports PORT#29 to port#32.

As apparent from FIGS. 7A to 7D, data for a plurality of VCI values are similarly written into the divided areas of each of the VPI fields (0≦n≦255, n is an integer).

As described above, in the memory map within the SRAM memory block 501, FIG. 7C is applied to the ports PORT#1 to #28 provided on the side of the tributary interfaces, whereas FIG. 7D is applied to the ports PORT#29 to #32 provided on the side of the aggregate interfaces. In case of the system having such an structure shown in FIGS. 7A to 7D, the VPI value is "8" bits and the VCI value is "5" bits in the ports PORT#1 to #28, whereas the VPI value is #4# bits and the VCI value is "9" bits in the ports PORT#29 to #32.

Figure 8A:
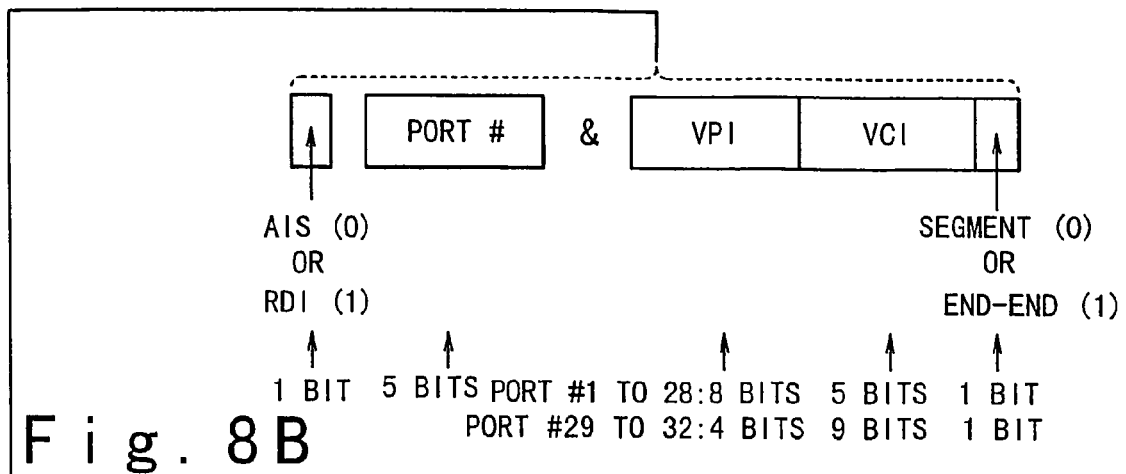
FIGS. 8A is a diagram showing an address structure of the SRAM memory block provided in the OAM cell processing block of FIGS. 4A and 4B.
Figure 8B:
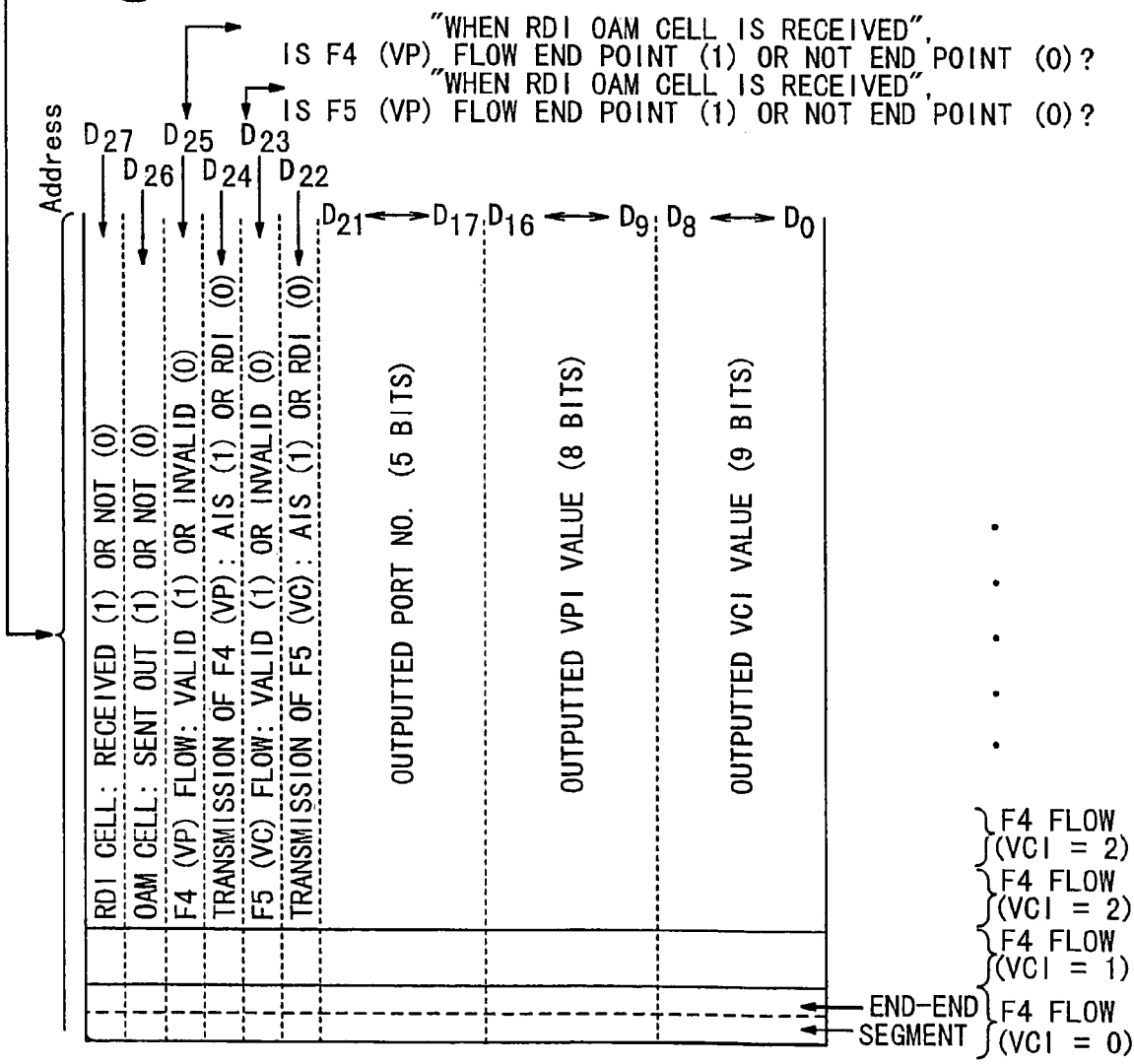
FIG. 8B is a diagram representing OAM cell data stored in a data segment of the SRAM memory block.

FIGS. 8A and 8B show a relationship between data related to an input OAM cell and data related to an output OAM cell stored in the SRAM memory block 501. FIG. 8A shows the structure of an address to designate a memory area. Referring now to FIG. 8A, a head bit is the LSB bit of the Function Type field within the cell payload of the OAM cell. The next 5 bits specify the output port number. This is the input port number written in the ATM cell header. Subsequently, a VPI value and a VCI value are written. In the port numbers #1 to #28, the VPI value is lower 8 bits of the ATM cell header, and the VCI value is 5 bits in a range of 6-th bit to 10-th bit from the LSB side. Also, in the port numbers #29 to #32, the VPI value is lower 4 bits of the ATM cell header, and the VCI value is 9 bits in a range of 6-th bit to 14-th bit from the LSB side. The LSB of the address is a pre-selected bit, value of either the VCI value or a PTI value to specify one of a segment connection and an end-end connection.

As above described, the processing operation of the OAM cell may be carried out based on whether the received OAM cell is an AIS OAM cell or an RDI OAM cell, what are a port number, a VPI value and a VCI value, and whether the connection type thereof is a segment connection or an end-end connection. For this purpose, one of the upper memory area and the lower memory area of the SRAM memory block 501 is designated based on the bit value of the Function Type field in the cell payload of the OAM cell, that is, based on whether the received OAM cell is an AIS OAM cell or an RDI OAM cell. In case of the AIS OAM cell, since the head bit of FIG. 8A is "0", a memory area for the ports port#1 to port#32 in the lower-half memory area of the SRAM memory block 501 is selected. On the other hand, in case of the RDI OAM cell, since the head bit of FIG. 8A is "1", a memory area for the ports port#1 to port#32 in the upper-half memory area is selected.

Next, an area corresponding to the port number in the selected one of the upper-half memory area and the lower-half memory area is designated based on the 5 bits indicative of the port number shown in FIG. 8A, that is, based on a data indicating that the received OAM cell is received by any port of the 32 ports.

Next, the VPI value of the received OAM cell shown in FIG. 8A is 8 bits for the ports port#1 to port#28, and 4 bits for the ports port#29 to port#32. An area for the VPI value within the area of the designated port number is designated based on the data indicative of the VPI value.

Next, a VCI value of the received OAM cell shown in FIG. 8A is 5 bits for the ports port#1 to port#28, and 9 bits for the ports port#29 to port#32. An area for the VCI value within the area for the VPI value is designated based on the data indicative of the VCI value.

Since the last bit indicative of a segment connection or an end-end connection is "0" in case of the segment connection, the lower address, i.e., an even address of the VCI area is designated. Also, since the last bit is "1" in case of the end-end connection, the upper address, i.e., an odd address of the VCI areas is designated.

The segment data as shown in FIG. 8B are stored in the SRAM memory block 501, while using the address as the unit.

The 28-bit segment data mentioned below are written at each of these addresses. That is, these 28-bit data includes a bit indicative of whether or not the RDI OAM cell is received (1 bit of D27); a bit indicative of whether the OAM cell is outputted as an AIS OAM cell or an RDI OAM cell (1 bit of D26); a bit indicative of whether the connection for an F4(VP) flow is valid (namely, usable or a terminate point) or invalid (namely, not usable or not a terminate point) (1 bit of D25); a bit indicative of whether the OAM cell to be outputted in the connection for the F4(VP) flow is an AIS OAM cell or an RDI OAM sell (1 bit of D24); a bit indicative of whether or not the connection for a F5(VC) flow is valid (namely, usable or a terminate point) or invalid (namely, not usable or not a terminate point) (1 bit of D23); a bit indicative of whether the OAM cell to be outputted in the connection for the F5(VC) flow is the AIS OAM cell or the RDI OAM cell (1 bit of D22); bits indicative of an output port (5 bits of D17 to D21) for the OAM cell to be outputted, bits indicative of a VPI value (8 bits of D9 to D16) and bits indicative of a VCI value (9 bits of D0 to D8).

Here, for instance, it is supposed that the received OAM cell is an AIS OAM cell, the reception port number is 1, the VPI value is 0, and the VCI value is 3 (segment) (in this case, a processing operation as VCI=0 is carried out). In this case, the lowest address is referred to in the memory area of the SRAM memory block, as shown in FIG. 8B.

The content of the OAM cell to be outputted is exclusively and primarily determined based on the above-described address. When a valid OAM cell is written into the SRAM memory block 501, the OAM cell is outputted from the output FIFO memory 701. In FIG. 3, the OAM cell is outputted from the OAM cell processing block 5 to the port B of the switch block 4 as the signal S801 once per a second. In the way, the OAM cell is outputted from the physical interface block 11 provided on the output side.

Also, when the port failure occurs, the RDI OAM cell is not received. Therefore, the head bit D27 is "0". Also, only the port number of a port where the port failure occurs is known. As a consequence, a plurality of addresses corresponding to the above data are accessed. Therefore, a plurality of output OAM cells are continuously outputted from the SRAM memory block 501 to the output FIFO memory 701.

Next, operations as well as timing with respect to read access and write access to the SRAM memory block 501 will be described below.

The write operation and the read operation to the SRAM memory block 501 are divided in the timing such that the internal circuit of the OAM cell processing block 5 and the CPU block 6 can access the SRAM 501. The operation/timing control will be described with reference to FIG. 9A to FIG. 9C.

First, a control signal for the timing division is generated by the 1/53-frequency dividing counter (3) 504. As shown in the timing chart of FIG. 9A, a period between the maximum arrival possible time (155 Mb/s) to the OAM cell processing block 5 and the maximum output possible time (155 Mb/s) from the OAM cell processing block 5 with respect to one ATM cell is set as one time period. Actually, since the data is developed into the 8-bit parallel data, the one ATM cell time is set to be 8 times longer than the time required for one ATM cell to be inputted or outputted at the transferred time of 155 Mb/s.

As shown in FIG. 9C, the one ATM cell time period is divided into a hardware access time and a CPU access time. Further, each of the hardware access time and the CPU access time is divided into a read access time and a write access time. That is, the one ATM cell time period for 53 bytes is divided into 4 time periods A, B, C and D. The counter (3) 504 frequency-divides the clock signal by 53 in correspondence with the clock division.

As shown in FIG. 9C, the first ATM cell time period "A" is defined by the bytes from a first byte to 14-th byte with respect to an SOC (Start Of Cell) signal as a reference. During the ATM cell time period "A", the read accessing operation to the SRAM memory block 501 is carried out by the internal circuit.

The next ATM cell time period "B" is a time defined by the bytes from 15-th byte to 28-th byte with respect to the Start Of Cell (SOC) signal. During the time period "B", the write accessing operation to the SRAM memory block 501 is carried out by the internal circuit.

The next ATM cell time period "C" is a time, defined by the bytes from 29-th byte to 42-th byte with respect to the Start Of Cell (SOC) signal. During the time period "C", the read accessing operation to the SRAM memory block 501 is carried out by the CPU block 6.

The final ATM cell time period "D" is a time defined by the bytes from 43-th byte to 53-th byte with respect to the Start Of Cell (SOC) signal. During the time period "D", the write accessing operation to the SRAM memory block 501 is carried out by the CPU block 6.

For the purpose of such access timing division, the timings at which various control signals to the SRAM memory block. 501 become active are required to be shifted. For this reason, the read (RD) signal S507 and the write (WR) signal S508 are generated by the selector (3) 502 and the selector (4) 503.

Control signals S511 and S512 supplied to the selector (3) 502 and the selector (4) 503 are generated by the counter (3) 504 (1/53-frequency division) of FIGS. 4A and 4B. As apparent from the above description, the control signal S511 becomes active during the time period A and the time period C, whereas the control signal S512 becomes active during the time period B and the time period D.

As a consequence, the selector (3) 502 selects the signal S505 outputted from the counter 504 during the time period A, and the selector (3) 502 selects the CPU read signal S804 supplied from the CPU block 6 during the time period C. The selected signal is outputted as the control signal S507 to the SRAM memory block 501. Also, the selector (4) 503 selects the signal S506 outputted from the counter 504 during the time period B, and the selector-4 503 selects the CPU read signal S805 supplied from the CPU block. 6 during the time period D. The selected signal is outputted as the control signal S508 to the SRAM memory block 501.

Also, address signals S403 and S404 are generated by the selector (1) 401 and the selector (2) 402. The control signals supplied to the selector (1) 401 and the selector (2) 402 are S308 and S309, respectively. Based on the control signal S309, one of the input signal A and the input signal B is selected, and one of the input signal C and the input signal D is selected. Based on the control signal S310, one of the input signal C and the input signal D is selected, and one of the input signal A and the input signal B is selected. For example, when the AIS OAM cell in the F5(VC) flow is received, the SRAM memory block 501 is accessed based on the above-described address (20 bits of AIS/RDI+reception port number+VPI+VCI+segment/end-end) during the first ATM cell time period "A".

When the AIS OAM cell is received, an RDI OAM cell needs to be sent back, in case that the ATM cell transfer apparatus is operated at either a terminal point of a segment connection or an end-end connection in the PVC connection. The RDI OAM cell is read out from the SRAM memory block 501 at an address corresponding to the received AIS OAM cell, and then is written into the output FIFO memory 701. As described above, the data of this RDI OAM cell is previously written in the SRAM memory block 501.

When the RDI OAM cell is received, the operation is carried out as follow. That is, the SRAM memory block 501 is accessed based on the data (20 bits of AIS/RDI+reception port number+VPI+VCI+segment/end-end) read out from the input FIFO memory (1) 201. At this time, since the RDI OAM cell is received, the first bit (AIS/RDI) of FIG. 8A is equal to "1". Therefore, the upper-half area of the SRAM memory area shown in FIGS. 7A to 7D is accessed.

As described above, the first ATM cell time period "A" is the read access time period. In case that the address of the OAM cell does not designates the ATM cell transfer apparatus of the present invention so that the-ATM cell transfer apparatus is not a terminal point in the PVC connection (refer to bits D23 and D25 in FIG. 8B), the data at this address is written into the output FIFO memory 701 as the RDI OAM cell without interruption, and then the RDI OAM cell is outputted. However, when the ATM cell transfer apparatus is the terminal point of this PVC connection, the RDI OAM cell needs to be terminated, and the RDI OAM cell is not outputted.

During the next ATM cell time period "B", a signal S802-3 outputted from the R/S flip-flop 703 is set, and then "1" is written into D27 bit (the most significant bit) of the data of the SRAM memory block 501, as described above. As a consequence, it is indicated that the RDI OAM cell has been received or is being received; when the above-described address is accessed. Also, similarly, when "1" is written in the D26 bit, it is indicated that the RDI OAM cell has been outputted. The control signal used to set/reset the R/S flip-flop 703 and the output timing of this control signal are similar to those in the case of reception of an AIS OAM cell in the F5(VC) flow.

Also, during both of the ATM cell time periods "C" and "D", the CPU block 6 accesses the SRAM memory block 501. As a result, the CPU block 6 reads the D27 bit and the D26 bit of the address and know whether the relevant RDI OAM cell has been received or is being received, and whether the output OAM cell corresponding to the RDI OAM cell has been continuously outputted when the ATM cell transfer apparatus is not the terminal point in the PVC connection.

Next, operations carried out during ATM time periods will be described below in detail.

During the ATM time period "A", the address to the SRAM memory block 501 is as follows. That is, in this case, both of the AIS/RDI (bit of "0" in this case) and the Port #number (5 bits) shown in FIG. 8B are outputted as the signal S301-1 to the selector (1) 401.

Also, the decoder 209 outputs the control signals S311-1 and S311-2 to the selector (5) 210 based on the data S301-2 of the received OAM cell (the data of the AIS OAM cell in the F5(VC) flow). In this case, the selector (5) 210 selects the data S301-3 as the output data S301-6 based on the control signals Slll-1 and S311-2. Thus, a portion of the address for both the VPI/VCI values and the segment/end-end connections in FIG. 8B is generated, and then is outputted as an address "A" to the selector (2) 402.

The counter (3) 504 generates the signal S309, and also the signal S308 is outputted from the input FIFO-2 203. Both of the selector, (1) 401 and the selector (2) 402 select the address "A" in response to the control signals S308 and S309, and then outputs this selected address "A" as the addresses S403 and S404 to the SRAM memory block 501. In this case, a control signal S505 is generated by the counter (3) 504, and is selected by the selector (3) 502 in response to the control signal S511. The control signal S505 is outputted as the read control signal S507 to the SRAM memory block 501 for the read accessing operation carried out by the internal circuit of the OAM cell processing block 5 (to be also referred to as a "hardware read access" operation). Thus, the OAM cell data corresponding to the received AIS OAM cell is outputted to the output FIFO memory 701.

The next ATM cell time period "B" is the write time period. A control signal S506 is generated by the counter (3) 504, and is selected by the selector (4) 503 in response to the control signal S512. Then, the control signal S506 is outputted as the write control signal S508 to the SRAM memory block 501 for the write accessing operation carried out by the internal circuit of the OAM cell processing block 5 (to be also referred to as a "hardware write access" operation).

At the same time, the signal S802-3 outputted from the R/S flip-flop 703 is set, "1" is written into the D26 bit (second most significant bit) of the data segment of the SRAM memory block 501 during the ATM cell time period B (see FIG. 7). As a result, it is indicated that the address is accessed so that the OAM cell has been outputted or is being outputted.

The control signal S510 used to set the R/S flip-flop 703 is periodically outputted from the counter (3) 504 at a timing of approximately 14-th byte from SOC signal shown in FIG. 9A immediately before the ATM cell time period "B" is started. However, in the actual case, the control signal 510 is made active, and then is outputted as the signal S705 to the R/S flip-flop 703 only when the flow of the OAM cell to be read/outputted is effective, namely either D25 bit (F4(VP)) or D23 bit (F5(VC)) (in this example, D23 bit) is valid.

At the end of the time period "B", i.e., approximately 28-th byte from SOC signal of FIG. 9A, the R/S flip-flop 703 is periodically reset in response to the signal S706 outputted from the counter (3) 504. In this case, the three-state buffer 704. is made active only during the ATM time period "B" in response to the signal S509 supplied from the counter (3) 504.

The output from the R/S flip-flop 703 is written as the signal S802-3 only when either the D25 bit (F4(VP)) or the D23 bit (F5(VP)) bit (D23 bit in this example) is valid. In this way, the output from the R/S flip-flop 703 is written in both of the OAM data which is stored in the output FIFO memory 701 and the OAM data which has been stored in the SRAM memory block 501 during this ATM cell time period "B".

The ATM cell time periods "C" and "D" are time periods that the CPU block 6 can access the SRAM memory block 501.

The ATM cell time period "C" is the read access time period. During the time period C, the CPU block 6 outputs the address. Also, a CPU read signal S804 used to read the data is selected by the selector (3) 502 in response to the signal S511. The selected signal is outputted as the signal S507 to the SRAM memory block 501. Also, the CPU address S803 is outputted to the SRAM memory block 501 in synchronous with the timing of the ATM cell time period. During the ATM cell time period "C", in addition to reading of the data, there is read out a data indicative of whether the AIS OAM cell or the RDI OAM cell is outputted (D26 bit) which is written during the hardware write access operation. Also, a data indicative of whether or not the RDI OAM cell has been received (D27 bit) are read out.

The ATM cell time period "D" is the CPU write access time period. During this time period D, the CPU block 6 outputs the CPU address S803. Also, a CPU write signal S805 for data write is selected by the selector (4) 503 in response to the signal S512. Then, the selected signal is outputted as a signal S508 to the SRAM memory block 501. Also, this CPU address S803 is outputted to the SRAM memory block 501 in synchronous with the timing of the ATM cell time period "D". During the ATM cell time period "D", the OAM cell data to be outputted is changed. For example, the type of the output OAM cell corresponding to the received OAM cell is set. For example, the AIS or the RDI (D22 bit or D24 bit) is set, and the output port (D17 to D21 bits), the VPI value (D9 to D16 bits) to be outputted, and the VCI value (D0 to D8 bits) to be outputted are set. In addition, whether or not the connection flow (F4 or F5 flow) is valid (under use) (D23 bit or D25 bit) is set. Also, during the ATM cell time period "D", the bit (D26) which has been set to "1" in the hardware write access operation after the OAM cell is outputted, is cleared to zero by the CPU block 6.

FIGS. 11A and 11B and FIG. 12 are flow charts showing OAM cell processing operations carried out by the ATM cell transfer apparatus of the present invention. In accordance with the present invention, there are three major factors as to why an OAM cell is generated. A case 1 is occurrence of a port failure, a case 2 is reception of an AIS OAM cell in an F4(VP) flow, and a case 3 is reception of an AIS OAM cell in an F5(VC) flow. These three cases will now be described with reference to the flow charts shown in FIGS. 11A and 11B, and FIG. 12.

First of all, an RDI signal is transferred to a physical layer (SDH/SONET layer) (block S1) when a port failure occurs (in this case, interruption of signal input and failure of loss of frame are assumed). At this time, whether or not an F4(VP) flow is present in the physical layer is determined (block S2). When the F4(VP) flow is present, the processing operation advances to a block S4. To the contrary, when it is determined at the block S2 that the F4(VP) flow is not present, this processing operation is ended (block S3).

At a block S4, whether the F4(VP) flow is terminated as the segment end point in a segment connection or a terminal point of an end-end connection for the OAM cell is determined. When the apparatus is the terminal point in the F4(VP) flow, the processing operation is advanced to a block S5. At the block S5, a RDI OAM cell for the end point of the segment connection or the end-end connection in the F4(VP) flow is sent out in a direction opposite to the signal reception direction, i.e., the signal backward direction. Also, the fact that the OAM cell has been received/transmitted is written in the SRAM memory block 501 to be notified to the CPU.

When the apparatus is not a terminal point, the processing operation is advanced to a block S6. At the block S6, an AIS OAM cell is sent out for the termination of the segment connection or end-end connection in the F4(VP) flow in the same direction as the signal reception, i.e., toward a port of the signal forward direction. Also, the fact that the OAM cell has been received/transmitted is written in the SRAM memory block 501 to be notified to the CPU.

Next, at a block S7, whether or not an F5(VC) flow is present within this F4(VP) flow is determined. When no F5(VC) flow is present, the processing operation is advanced to a block S8 at which the processing operation of the OAM cell is ended.

When an F5(VC) flow is present in the F4(VP) flow, whether the apparatus is a terminal point for an OAM cell in a segment connection or an end-end connection in F5(VC) flow is determined at the block S9; When the apparatus is the terminal point in the F5(VC) flow, the processing operation is advanced to a block S10. At the block S10, an RDI OAM cell for the segment connection or end-end connection in the F5(VC) flow is sent out to a counter apparatus in a direction opposite to the signal reception direction. Also, the fact that the OAM cell has been received/transmitted is written into the SRAM memory block 501 to be notified to the CPU. Thereafter, the processing operation of the OAM cell is ended.

When the apparatus is not a terminal point in the F5(VC) flow, the processing operation is advanced to a block S12. At the block S12, an RDI OAM cell for the terminal point of the segment connection or end-end connection in the F5(VC) flow is sent out to a port in the signal forward direction. Also, the fact that the OAM cell has been received/transmitted is written into the SRAM memory block 501 to be notified to the CPU. Thereafter, the processing operation of the OAM cell is ended. That is, at this time, the data bit D24 (in the case of F4(VP) flow) or the data bit D22 (in the case of F5(VC) flow) contained in the SRAM memory block 501 is only set to "1" by the CPU block 6. The OAM cell may be outputted as the AIS OAM cell.

As described above, the timings when these processing operations are carried out, are mainly generated by the 1/53-frequency dividing counter (3) 504 shown in FIGS. 4A and 4B. Any one of the CPU read signal S804 and the write signal 5805 supplied to the SRAM memory block 501, and the hardware read signal S505 and the hardware write signal S506 contained in the OAM cell processing block 5 is selected by the selector (3) 502 and the selector (4) 503 in response to the control signal generated from the counter (3) 504.

The control signals supplied to these selectors are generated as a signal S5112 or S511 by the counter (3) 504. Which of the CPU read signal S804, the CPU write signal S805, the hardware read signal S505 and the hardware write signal S506 should be supplied to the SRAM memory block 501 is controlled based on the control signal S5112 or S511.

Also, the control signals supplied to the selector (1) 401 and the selector (2) 402 as the address selecting circuits may be generated in a similar manner. The selection between the address signal A S301-1 from the OAM cell and the address signal B outputted from the CPU block 6 is controlled by the signal S309 supplied from the counter (3) 504.

In the counter (1) 202, the port failure signal S308 from the input FIFO memory (2) 203 is continuously monitored. When no port failure occurs, an operation is repeated in which the next input OAM cell is read out from the input FIFO memory (1) 201 and an OAM cell corresponding to the input OAM cell is outputted.

When an AIS OAM cell is received in the F4(VP) flow, or when an AIS OAM cell is received in the F5(VC) flow, the above flow chart operation is commenced from the block S4 or S9. As a result, the OAM cell processing operation may be carried out in a similar manner to the above-described case.

Next, as the case 3 shown in FIG. 12, when an RDI OAM cell in the F4(VP)/F5(VC) flow is received, the RDI OAM cells corresponding to the received RDI OAM cell are continuously outputted into the signal forward direction without interruption, in case that the ATM cell transfer apparatus of the present invention is not a terminal point of the PVC connection. Also, in order to notify the arrival of the RDI OAM cell to the CPU (block S16), the fact that the RDI OAM cell has been received is written in the relevant address on the SRAM memory block 501.

Also, in case that the ATM cell transfer apparatus is as the terminal point of the PVC connection, the RDI OAM cell is terminated without being continuously outputted in the ATM cell transfer apparatus of the present invention. Also, only the arrival of the OAM cell is notified to the CPU (block S15). As a consequence, the fact that this OAM cell has been received is written in the relevant address of the SRAM memory block 501.

The above-described processing operation may be realized by the OAM cell processing block 5 having the above-described hardware structure, not by the conventional software processing operation carried out in software by the CPU.

Next, a processing operation (case 1 of FIGS. 11A and 11B) that an OAM cell is outputted due to a port failure such as interruption of input cell and loss of frame will be described below. FIGS. 10A to 10D shows a condition of an OAM cell transferring operation when a port failure occurs. In this case, as a processing operation to be carried out, the following cell transferring operations should be carried out. That is, when the ATM cell transfer apparatus is a terminal point in a segment connection, an RDI OAM cell needs to be transferred in the signal backward direction for each of the F4(VP) flows and the F5(VC) flows. When the ATM cell transfer apparatus is not the terminal point in the segment connection, the AIS OAM cell needs to be transferred in the signal forward direction for each of the F4(VP) flows and the F5(VC) flows. When the ATM cell transfer apparatus is a terminal point in an end-end connection, an RDI OAM cell needs to be transferred in the signal backward direction for each of the F4(VP) flows and the F5(VC) flows. Also, when the ATM cell transfer apparatus is not the terminal point in the end-end connection, an AIS OAM cell needs to be transferred in the signal forward direction for each of the F4(VP) flows and the F5(VC) flows.

Such an operation is required to be applied to all of the effective PVC connections under use. In case that a plurality of VP (Virtual Path) connections are present in a single port and a plurality of VC (Virtual Channel) connections are present in each of the plurality of VP connections, a large number of OAM cells need to, be generated at a time. That is, as described above, all of the OAM cells need to be periodically generated once per one second.

Both of the data (5 bits in this example) S103 indicative of a physical port number of a physical port where any failure occurs and the bit S105 indicative of the failure of the physical port are written into the input FIFO memory (2) 203 in response to the write timing control signal S207 generated from the counter (2) 204.

The failure data is read out in response to the read timing control signal S208 generated by the counter (2) 204. At this time, a fact that the failure occurs in the physical port has been detected based on the signal S308 corresponding to the signal S105 indicative of the port failure is read out from the input FIFO memory (2) 203. Also, the OAM cells need to be outputted for the segment connection or the end-end connection in all the F4(VP)/F5(VC) flows effective on this port.

For this purpose, the 1-bit signal S308 indicative of that the physical port is in any failure state is first supplied to both the selector (1) 401 and the selector (2) 402. Then, a lower input signal ("C" or "D") in the respective selectors is selected. The data S306 has 5 bits in the same manner as the signal S103 and is read out from the input FIFO memory (2) 203. The read data indicates the physical port number of the physical port where the failure occurs and is supplied as an address "C" to the selector (1) 401. Thus, as shown in FIGS. 4A and 4B, a portion shown by Port# in FIG. 8A of data segments provided on the SRAM memory block 501 is first read. In this case, since the OAM cell is outputted, the most significant bit corresponding to the AIS/RDI bit shown in FIG. 8A of the address is set to "0". As a result, a lower-half memory area of FIGS. 7A to 7D is selected, and then the address is outputted as the signal S403 from the selector (1) 401.

As described above, the data segment portion corresponding to this physical port is furthermore divided in detail. There are data segments in all of the F4(VP) flows for the VPI values of "0" to "255" in this port, and furthermore, a data structure contained in each of these VPI values is indicated in FIGS. 7A to 7D.

As to an address portion (14 bits of VPI/VCI/segment/end-end in total in FIG. 8A) to the SRAM memory block 501, the signal S513 outputted from the address counter 806 is selected as the output S404 from the selector (2) 402 based on the control signal S308. In this case, the least significant bit of the address of the data segment portion provided on the SRAM memory block 501 needs to be referred. The address is generated by resetting the address counter 806 at the timing shown in the time charts of FIGS. 10A to 10D, i.e., at the timing when the port failure occurs, and thereafter sequentially counting up. This resetting operation is carried out in response to a pulse signal which is generated from the reset signal generating circuit 406, when the port failure signal S308 is read out from the input FIFO memory (2) 203 shown in FIGS. 4A and 4B, and is supplied to the reset signal generating circuit 406, as shown in FIG. 10B.

As shown in FIGS. 10a to 10D, the counting up operation of the address counter 806 is carried out in the unit of the maximum arrival or output time (155 Mb/s) of one ATM cell. While the address to the SRAM memory block 501 shown in FIGS. 4A and 4B is incremented one by one, the accessing operation is carried out to each of these addresses. When there is any OAM cell to be sent out, the OAM cell is read out from the SRAM memory block 501. Thereafter, the read OAM cell is written into the output FIFO memory 701.

It should be understood that various control operations for the SRAM memory block 501 in the hardware manner are carried out in a similar manner when-the above-described AIS OAM cell in the F5(VC) flow is inputted. The control operations includes writing and reading timing controls, the transmission/sending-back operations of an OAM cell, and the control of the bit (bit D26 of FIG. 8B) which indicates that the OAM cell is outputted. A similar control operation is carried out with respect to the accessing operation from the CPU block 6.

The selectors (1) to (4) are controlled based on the timings divided in FIGS. 9A to 9C, so that the reading and writing operation of data from/into the SRAM memory block 501 is carried out. Until the signal S513 outputted from the address counter 806 is counted up to a predetermined value, the counter (2) 204 monitors a part S513-3 of the signal S513. In this case, the signal part S513-3 is 14-th bit from the most significant bit of the address for the data segments corresponding to each of the ports shown in FIGS. 7A to 7D. When the content of the counter (2) 204 is counted up to the predetermined value, the next port failure data is read out from the input FIFO memory (2) 203.

Also, while the OAM cell is outputted due to the occurrence of port failure, the reading operation from the input FIFO memory (1) 201 is not carried out. An OAM cell supplied as the signal S101 is stored into the input FIFO memory (1) 201 until the signal S307 indicative of the port failure becomes inactive in the counter (1) 202.

Next, a processing operation in which the OAM cell is outputted when an AIS OAM cell in the F4(VP) flow is received will be described with reference to the case 2 in FIGS. 11A and 11B. In this case, the OAM cells for the segment connection or the end-end connection for all of the effective F5(VC) flows in each F4(VP) flow need to be outputted.

FIGS. 11A and 11B show a condition of an OAM transferring operation in case that the AIS OAM cell in the F4(VP) flow is received similar to the port failure case. In this case, processing operations which should be carried out are given as follows. That is, when the ATM cell transfer apparatus is a terminal point in the segment connection, RDI OAM cells need to be transferred in the signal backward direction for the respective F4(VP)/F5(VC) flows. When the ATM cell transfer apparatus is not a terminal point in the segment connection, AIS OAM cells must be transferred in the signal forward direction for the respective F4(VP)/F5(VC) flows. Also, when the ATM cell transfer apparatus is a terminal point in an end-end connection, RDI OAM cells need to be transferred in the signal backward direction for the respective F4(VP)/F5(VC) flows. Also, when the ATM cell transfer apparatus is not a terminal point in the end-end connection, AIS OAM cells need to be transferred in the signal forward direction for the respective F4(VP)/F5(VC) flows.

Referring now to FIGS. 4A and 4B, the operations in this case will be described. Similar to the operation carried out when the AIS OAM cell in the F5(VC) flow is received (refer to case 3 in FIGS. 11A and 11B), the SRAM memory block 501 is accessed based on the above-described address (20 bits of AIS/RDI+reception port number+VPI+VCI+segment/end-end) in the first ATM cell time period "A". In this case, it may be considered that the F4(VP) flow fails, which is different from the above-described case that the physical port fails.

Similar to the above-described case that the physical port fails, in the ATM cell time period "A", both of AIS/RDI ("0" in this case) and a port number Port# (5 bits) shown in FIG. 8A are outputted as the signal S301-1 as the address to the SRAM memory block 501 (case 2 of FIGS. 11A and 11B). The selector (1) 401 selects it as the address "A".

As another address portion (14 bits of VPI/VCI/segment/end-end in total in FIG. 8A), the signal S513-1 or the signal S513-2 is selected by the selector (5) 210 of FIGS. 4A and 4B as the output data S301-6 based on the control signals S311-1 and S311-2 which are outputted from the decoder 209 to the selector-5 210 based on the reception OAM cell data S301-2 (AIS OAM cell data in F4(VP) flow).

In case that the signal S513-1 is selected, the F4(VP) AIS OAM cell is received at the ports #29 to #32, and the signal S513 outputted from the address counter (4) 806 is selected as the signal S301-4 in addition to the 4-bit VPI value (see FIG. 8A). 10-bit counter data from a first bit to a tenth bit is used as a lower bit portion, and the lower bit portion is merged with the previously described 4-bit VPI value S301-4. Then, the merged bits are supplied to the selector (5) 210 as a 14-bit (in total) signal S513-l. In case that the signal S513-2 is selected, an AIS OAM cell in F4(VP) flow is received at the ports #1 to #28. In this case, the signal S513 outputted from the address counter (4) 806 is selected as the signal S301-5 in addition to the 8-bit VPI value (see FIG. 8A). 6-bit counter data from a first bit to a sixth bit is used as a lower bit portion, and the lower bit portion is merged with the previously described 8-bit VPI value S301-5. Then, the merged signal is supplied to the selector-5 210 as the 14-bit (in total) signal S513-2. In the selector-2 402 of FIGS. 4A and 4B, the address "A" (14 bits of the signal S301-6) is selected, and the address "A" is outputted as the address S404 to the SRAM memory 501.

The next ATM cell time period B is a hardware write access time period in which a processing operation is carried out to the output FIFO memory 701. The control for D26 bit of data of the SRAM memory block 501 by way of a control of the R/S flip-flop 703 is performed in a similar manner to the above-described processing operation carried out when the AIS OAM cell in the F5(VC) flow is received. Also, since the above-described 1-bit signal S308 indicating that the physical port is in the failure state does not become active, the selector (1) 401 and the selector (2) 402 select the input signal A and the input signal B as the upper bit portion, respectively, in a similar manner that the AIS OAM cell in the F5(VC) flow is received.

Similar to the operation carried out when the port failure occurs, a portion of the data segment, i.e., the least significant bit of an address for each of the VPI segments provided on the SRAM memory block 501 needs to be referred. The generation of the addresses is carried out by resetting the address counter (4) 806 at timing shown in the time charts of FIGS. 9A to 9C, i.e., at the timing when the AIS OAM cell in the F4(VP) flow is received. Thereafter, the address is sequentially counted up.

Similar to the resetting operation carried out when the port failure occurs, the resetting operation is carried out in response to a pulse signal which is generated from the reset signal. generating circuit 406 when the reception signal S301-5 of the AIS OAM cell in the F4(VP) flow is read out from the input FIFO memory (1) 201 shown in FIGS. 4A and 4B and is supplied to the reset signal generating block 406.

The writing operation of the output OAM cell data into the output FIFO memory 701 and the access timing from the CPU block 6 to the SRAM memory block 501 in the ATM cell time periods C and D shown in FIGS. 9A to 9C are carried out in a similar manner to a case that the AIS OAM cell in the F5(VC) flow is received.

In order that all of the necessary OAM cells for the respective. VPI segments shown in FIGS. 7A to 7C are outputted, when the counter content of the counter (1) 202 is not counted up in response to the signal S513 supplied from the address counter 806 by the signal S513-1, namely, when the counter is counted at Port #29 to Port #32, the signal corresponds to a 10-th bit of the signal S513. Also, when the counter is counted at Port #1 to port #28, the signal corresponds to a 5-th bit of the signal S513. In such a case that the most significant bit of the address for each of the VPI segments shown in FIGS. 7A to 7D is not accessed, no reading operation of the next input OAM cell data from the input FIFO memory (1) 201 is carried out.

Similarly, when the next port fail data S307 is read out from the input FIFO memory (2) 203, no data is read out from the input FIFO memory (2) 203 until the count-up of the address counter 806 is accomplished.

In case that an RDI OAM cell in a F4(VP) flow or an F5(VC) flow is received (case 3 of FIG. 12), when the ATM cell transfer apparatus does not operate as a terminal point of this PVC connection, OAM cell corresponding to the received RDI OAM cell is continuously outputted without any interruption. Also, this reception of the RDI OAM cell is notified to the CPU (step S16 of FIG. 12).

When the ATM cell transfer apparatus operates as the terminal point of the PVC connection, the output of the RDI OAM cell is terminated by the ATM cell transfer apparatus without continuously outputting the OAM cell corresponding to the RDI OAM cell. Only the reception of this RDI OAM cell is notified to the CPU (step S15 of FIG. 12).

The above-described operations are the major operations of the ATM transfer apparatus according to the first embodiment.

Figure 13A:
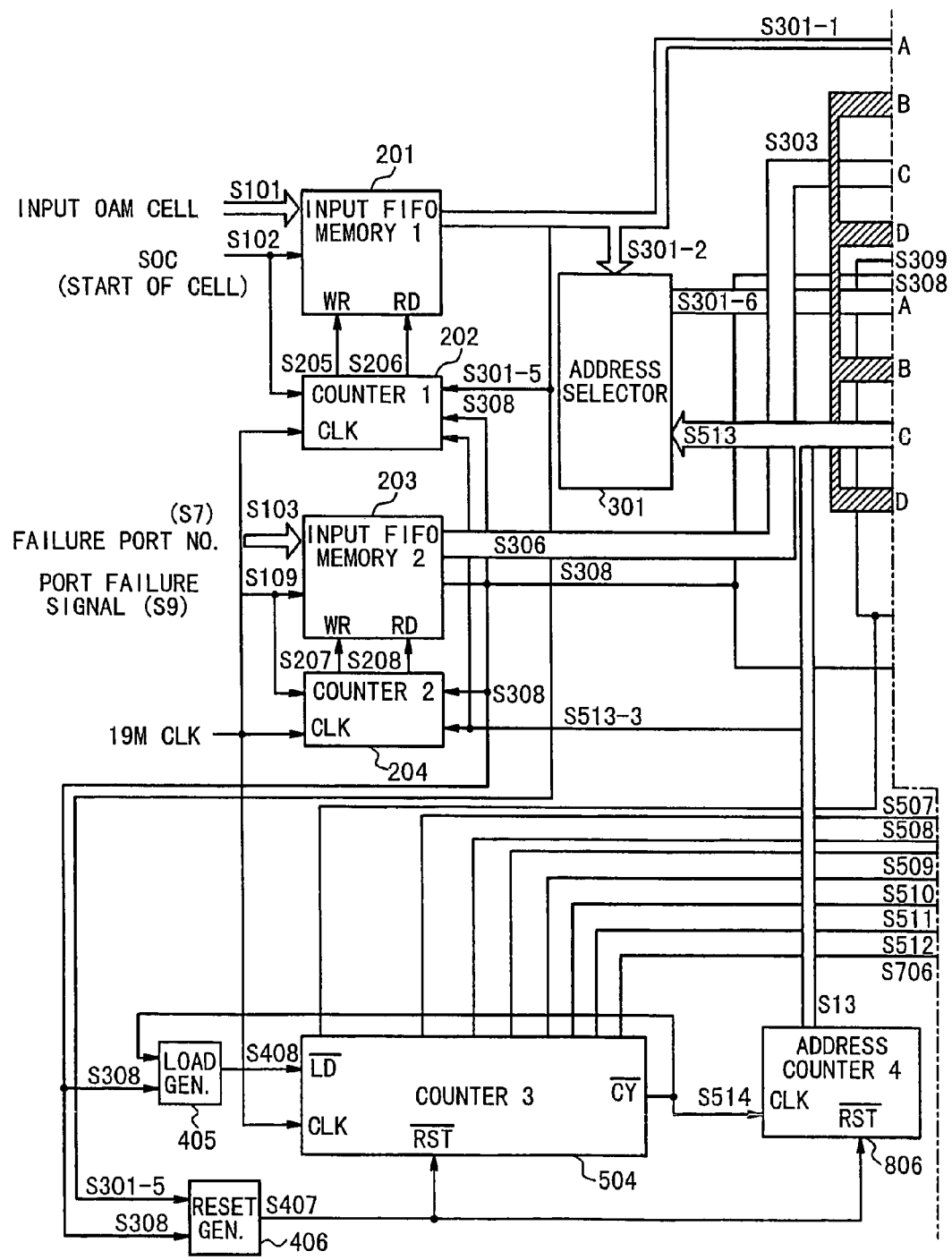
FIGS. 13A and 13B are block diagrams showing the structure of an OAM cell processing block used in the ATM cell transfer apparatus according to a second embodiment of the present invention.
Figure 13B:
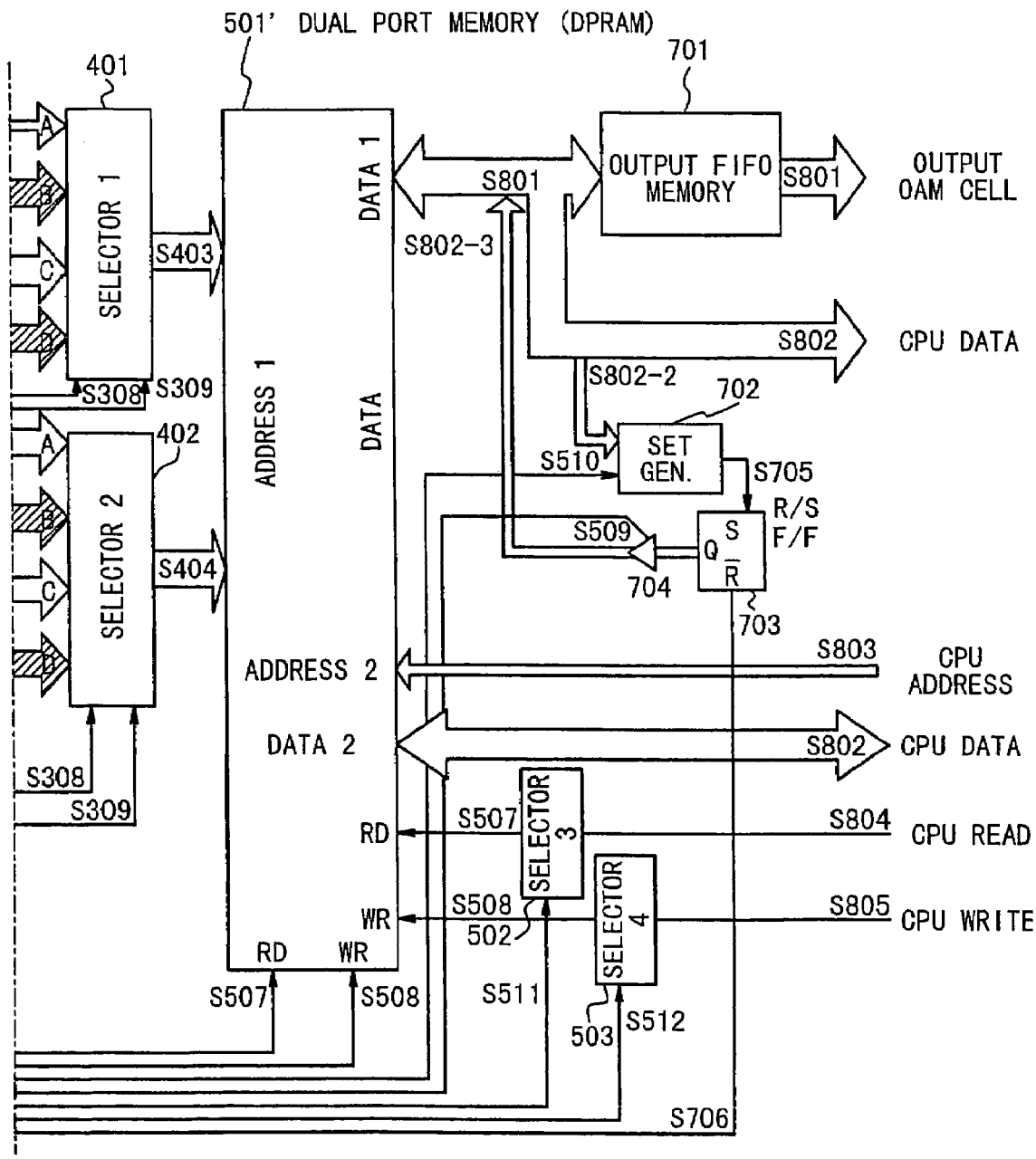
Figure 15:
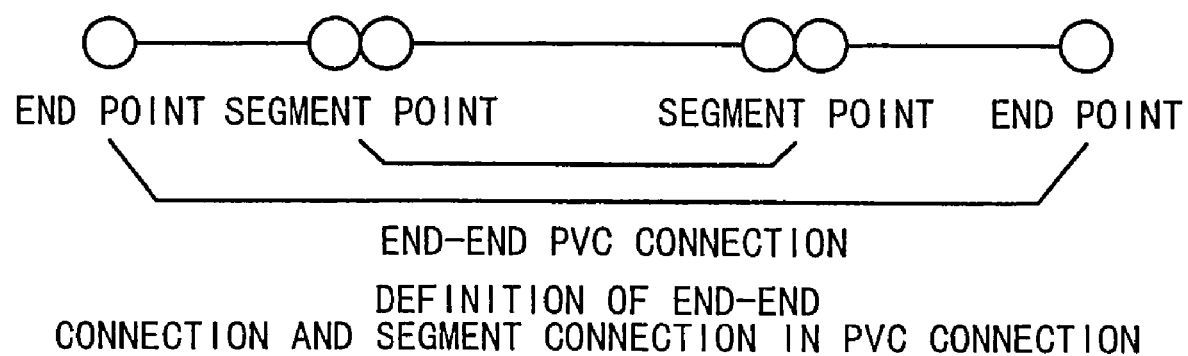
FIG. 15. is a diagram showing an end-end connection and a segment connection in a PVC connection.

Next, the ATM cell transfer apparatus according to the second embodiment of the present invention will now be described. FIGS. 13A and 13B show the structure of the OAM cell processing block 5 employed in the ATM cell transfer apparatus according to the second embodiment of the present invention.

As apparent from a comparison between the structure of the first embodiment shown in FIGS. 4A and 4B, and the structure of the second embodiment shown in FIGS. 13A and 13B, a basic structural different is in that the SRAM memory block 501 is replaced by a DPRAM (Dual Port RAM) memory block 501'. In principle, when the same address is read-accessed or write-accessed from different ports (1, 2) at the same time in a DPRAM memory, there is a possibility that data becomes uncertain. As a consequence, timing of a read control signal and timing of a write control signal from the different ports should be separated to be outputted. Since the generating timing of the various types of control signals to the DPRAM memory block 501' is made equal to those of FIGS. 4A and 4B, these various control signal generating timing may be separately outputted.

First, as to control signals (read signal: RD and write signal: WR) outputted from hardware, signals S505 and S506 are directly supplied to the DPRAM memory block 501, and data are read from addresses designated by the selector (1) 401 and the selector (2) 402 to be written into the output FIFO memory 701. Also, the data are written into the designated address of the DPRAM memory block 501'.

The control signals (read signal: CPU read S804 and write signal: CPU write S805) supplied from the CPU block 6 are generated at a timing which is not predicted by the hardware. This unpredictable timing is changed into predictable timing which will then be outputted to the DPRAM memory block 501'. This control operation is carried out by the selector (3) 502 and the selector (4) 503. Also, the control signal is outputted at the controlled timing based on the signal S511 and the signal S512 as the signals S507 and S508 to the DPRAM memory block 501' during the CPU access time period.

Similarly, the address S803 outputted from the CPU block 6 is supplied as an address 2, and also the data S802 is inputted/outputted as data 2. The signals outputted from the selector (1) 401 and the selector (2) 402 are outputted to the DPRAM memory block 501' as addresses for hardware access. However, the signals which have been outputted from the CPU block 6 as the signals supplied to these selectors in the first embodiment are not selected during the ATM cell time periods C and D. These signals are hatched in FIGS. 13A and 13B. Even when an uncertain content is outputted at the timing for the CPU block 6 by the selector 1 and the selector 2, the uncertain content is outputted as data 1, so that no data is written into the output FIFO memory 701.

The above-described operations of the ATM cell transfer apparatus according to the second embodiment are a major different point from the first embodiment. It should be understood that the input timing of the OAM cell and the port failure signal, the write timing of the cell data to the output FIFO memory 701, and the output timing of the OAM cell from the output FIFO memory 701 used in the second embodiment are basically and completely identical to those of the first embodiment.

As a consequence, the input/output operations of the OAM cells in accordance with the flow charts shown in FIGS. 11A and 11B and FIG. 12 are similarly performed in this second embodiment. Also, since a memory map about the respective data of the DPRAM memory block 501' is similar to the memory map about the data of the SRAM memory block 501, the above-described description thereof and the drawings of the first embodiment may be directly applied to those of the second embodiment.

As described above in detail, in accordance with the present invention, the CPU block does not execute all of the processing operations required for receiving/generating the OAM cell, but a major portion of these required processing operations is carried out by the specific hardware of the ATM cell transfer apparatus. As a consequence, the ATM cell transfer apparatus can achieve the below-mentioned effects.

(1). In a case that any failure such as interruption of signal input, an error on a signal line, and LOF (Loss Of Frame) occurs on the port which terminates the transfer path or the interface (SDH/SONET layer functioning as a physical layer) for this transfer path, the sending back of an RDI OAM cell and generation and transfer of an AIS OAM cell can be carried out at the correct timing (at an interval of 1 time/1 second) which is defined in the internal standardization such as I.610 of ITU-T and ATM Forum (UNU 3.1) for each of a plurality of F4(VP) flows in the physical port, for each of a plurality of F5(VC) flows in each of the plurality of F4(VP) flows, for each of the segment connection and the end-end connection.

Also, the contents (port number/VPI value/VCI value) of the generated OAM cell can be correctly notified to the CPU.

(2) Even when the AIS OAM cell is received in the irregular (burst) manner for each of the segment connection and the end-end connection in each of the respective F4(VP)/F5(VC) flows, the content (port number/VPI value/VCI value) of this AIS OAM cell can be correctly notified to the CPU. Also, the RDI OAM cell can be sent back and also the AIS OAM cell can be generated/transferred as the connection relay point at the correct timing (interval of 1 time/1 second) as defined by the international standardization.

(3) Even when the two type of RDI OAM cells are received in the irregular (burst) manner for the end-end connection and the segment connection in each of the respective F4(VP)/F5(VC) flows, the content (port number/VPI value/VCI value) of the OAM cell can be correctly notified to the CPU. The RDI OAM cell can be generated/transferred as the connection relay point at the correct timing (interval of 1 time/1 second) as defined by the international standardization.

What is claimed is:

1. A cell transfer apparatus, comprising:
a physical interface block that includes a plurality of input ports to receive a plurality of signals and a plurality of output ports to output the plurality of signals;
a switch block that includes a plurality of input ports to receive the plurality of signals from the plurality of output ports of the physical interface block and a plurality of output ports, the switch block to:
   receive an input operation and maintenance (OAM) cell at a first one of the input ports,
   transfer the input OAM cell and an input port number associated with the first one of the input ports to a first one of the output ports,
   receive an output OAM cell at a second one of the input ports, and
   transfer the output OAM cell to a second one of the output ports;
   where, the switch block further is to write the input port number associated with the first one of the input ports in a Header Error Control (HEC) field of the input OAM cell; and
an OAM cell processing hardware block connected to the first one of the output ports and the second one of the input ports of the switch block and comprising:
   a memory unit to store the output OAM cell and output the output OAM cell to the switch block based on the input OAM cell, the input port number and a port failure signal transmitted from the physical interface block.

2. The cell transfer apparatus of claim 1, where the input OAM cell is an alarm indication signal (AIS) OAM cell,
where the OAM cell processing hardware block is to:
   read a remote defect indication (RDI) OAM cell or an AIS OAM cell as the output OAM cell from the memory unit, and
   output the RDI OAM cell or the AIS OAM cell from the memory unit to the second one of the input ports of the switch block.

3. The cell transfer apparatus of claim 1, where the input OAM cell is a remote defect indication (RDI) OAM cell,
where the OAM cell processing hardware block is to:
   read an RDI OAM cell as the output OAM cell from the memory unit, and
   output the RDI OAM cell from the memory unit to the second one of the input ports of the switch block.

4. The cell transfer apparatus of claim 1, where the OAM cell processing hardware block is to:
   receive a port failure signal when a failure occurs in the cell transfer apparatus,
   generate a plurality of output OAM cells based on a port number associated with one of the input ports with which the port failure is associated, and
   output the output OAM cells to the second one of the input ports of the switch block.

5. The cell transfer apparatus of claim 1, where the OAM cell processing hardware block further comprises:
   a first input storage unit to temporarily store the input OAM cell and the port number from the first one of the output ports, and
   an output storage unit to temporarily store the output OAM cell from the memory unit and provide the output OAM cell to the second one of the input ports of the switch block.

6. The cell transfer apparatus of claim 5, where the OAM cell processing hardware block further comprises:

a second input storage unit to temporarily store a failure port number associated with one of the input ports with which the port failure is associated and output the failure port number to the memory unit.

7. The cell transfer apparatus of claim 1, further comprising:
a software executing unit to store or change the output OAM cell in the memory unit of the OAM cell processing hardware block.

8. The cell transfer apparatus of claim 1, where the OAM cell processing hardware block further comprises:
an address generating circuit section to continuously generate address data to cause the memory unit to continuously output output OAM cells.

9. The cell transfer apparatus of claim 1, where the output OAM cell includes an alarm indication signal (AIS) OAM cell or a remote defect indication (RDI) OAM cell,
where the memory unit includes a first area for storing AIS OAM cells and a second area for storing RDI OAM cells.

10. A cell transfer apparatus, comprising:
a physical interface block that includes a plurality of input ports to receive a plurality of signals that include asynchronous transfer mode (ATM) cells and a plurality of output ports to output the ATM cells;
a switch block including:
a plurality of input ports to receive the ATM cells from the plurality of output ports of the physical interface block, and
a plurality of output ports; where
the switch block further is to write an input port number associated with one of the plurality of input ports in an Header Error Control (HEC) field of the input OAM cell;
an operation and maintenance (OAM) cell processing hardware block including:
a memory unit to store an output OAM cell corresponding to an input OAM cell received at one of the input ports of the switch block and output the output OAM cell to the switch block responsive to the input OAM cell and a port failure signal transmitted from the physical interface block, and
a software executing unit to store or change the output OAM cell in the memory unit of the OAM cell processing hardware block.

11. The cell transfer apparatus of claim 10, where the input OAM cell is an alarm indication signal (AIS) OAM cell,
where the OAM cell processing hardware block is to:
read a remote defect indication (RDI) OAM cell and an AIS OAM cell as the output OAM cell from the memory unit, and
output the RDI OAM cell and the AIS OAM cell from the memory unit to another one of the input ports of the switch block.

12. The cell transfer apparatus of claim 10, where the input OAM cell is a remote defect indication (RDI) OAM cell,
where the OAM cell processing hardware block to:
read an RDI OAM cell as the output OAM cell from the memory unit, and
output the RDI OAM cell from the memory unit to another one of the input ports of the switch block.

13. The cell transfer apparatus of claim 10, where the switch block is to:
receive the input OAM cell at the one of the input ports, and
transfer the input OAM cell to the one of the output ports with a port number associated with the one of the input ports.

14. The cell transfer apparatus of claim 13, where the OAM cell processing hardware block further comprises:
a first input storage unit to temporarily store the input OAM cell and the input port number from the switch block, and
an output storage unit to temporarily store the output OAM cell from the memory unit and provide the output OAM cell to the switch block.

15. The cell transfer apparatus of claim 10, where the OAM cell processing hardware block is to:
receive a port failure signal when a failure occurs in the cell transfer apparatus,
generate a plurality of output OAM cells based on a port number associated with one of the input ports of the switch block with which the port failure is associated, and
output the output OAM cells to the another one of the input ports of the switch block.

16. The cell transfer apparatus of claim 10, where the OAM cell processing hardware block further comprises:
an address generating circuit section to continuously generate address data to cause the memory unit to continuously output output OAM cells.

17. The cell transfer apparatus of claim 10, where the output OAM cell includes an alarm indication signal (AIS) OAM cell or a remote defect indication (RDI) OAM cell,
where the memory unit includes a first area for storing AIS OAM cells and a second area for storing RDI OAM cells.

18. A cell transfer apparatus, comprising:
a physical interface block that includes a plurality of input ports to receive a plurality of signals and a plurality of output ports to output the plurality of signals;
a switch block including:
a plurality of input ports to receive the plurality of signals from the plurality of output ports of the physical interface block, and
a plurality of output ports;
where the switch block further is to write an input port number associated with a first input port of the plurality of input ports in an Header Error Control (HEC) field of the input OAM cell, and
an operation and maintenance (OAM) cell processing hardware block for:
receiving a port failure signal, from the physical interface block, when a failure is associated with one of the input ports of the switch block,
generating a plurality of output OAM cells based on a port number associated with the one of the input ports and the port failure signal transmitted from the physical interface block, and
outputting the plurality of output OAM cells to another one of the input ports of the switch block.

* * * * *